United States Patent
Song et al.

(10) Patent No.: US 10,883,363 B2
(45) Date of Patent: Jan. 5, 2021

(54) METHOD AND SYSTEM FOR PERFORMING COMMUNICATIONS USING ALIASING

(71) Applicants: Limin Song, West Windsor, NJ (US);
Scott W. Clawson, Califon, NJ (US);
Yibing Zhang, Annandale, NJ (US);
Katie M. Walker, Milford, NJ (US)

(72) Inventors: Limin Song, West Windsor, NJ (US);
Scott W. Clawson, Califon, NJ (US);
Yibing Zhang, Annandale, NJ (US);
Katie M. Walker, Milford, NJ (US)

(73) Assignee: ExxonMobil Upstream Research Company, Spring, TX (US)

( * ) Notice: Subject to any disclaimer, the term of this patent is extended or adjusted under 35 U.S.C. 154(b) by 144 days.

(21) Appl. No.: 16/139,394

(22) Filed: Sep. 24, 2018

(65) Prior Publication Data
US 2019/0112916 A1  Apr. 18, 2019

Related U.S. Application Data

(60) Provisional application No. 62/572,142, filed on Oct. 13, 2017.

(51) Int. Cl.
*E21B 47/14* (2006.01)
*H04B 11/00* (2006.01)
(Continued)

(52) U.S. Cl.
CPC ............ *E21B 47/14* (2013.01); *E21B 47/017* (2020.05); *E21B 47/13* (2020.05); *E21B 47/16* (2013.01);
(Continued)

(58) Field of Classification Search
CPC ...... E21B 47/14; E21B 47/011; E21B 47/122; E21B 47/124; E21B 47/16; E21B 11/00;
(Continued)

(56) References Cited

U.S. PATENT DOCUMENTS

| 3,103,643 A | 9/1963 | Kalbfell | 340/17 |
| 3,205,477 A | 9/1965 | Kalbfell | 340/18 |

(Continued)

FOREIGN PATENT DOCUMENTS

| CN | 102733799 | 6/2014 | ............. E21B 47/16 |
| EP | 0636763 | 2/1995 | ............. E21B 47/12 |

(Continued)

OTHER PUBLICATIONS

U.S. Appl. No. 15/666,334, filed Aug. 1, 2017, Walker, Katie M. et al.

(Continued)

*Primary Examiner* — Amine Benlagsir
(74) *Attorney, Agent, or Firm* — ExxonMobil Upstream Research Company—Law Department

(57) ABSTRACT

A method and system are described for wirelessly communicating within a wellbore. The method includes constructing a communication network (e.g., which uses aliased signals as part of the configuration) for a wellbore accessing a subsurface region and using the communication network in hydrocarbon operations, such as hydrocarbon exploration, hydrocarbon development, and/or hydrocarbon production.

44 Claims, 6 Drawing Sheets

(51) Int. Cl.
  *E21B 47/16*    (2006.01)
  *E21B 47/13*    (2012.01)
  *E21B 47/017*   (2012.01)
  *E21B 47/26*    (2012.01)
  *G01V 1/44*     (2006.01)
  *G01V 3/30*     (2006.01)
  *G01V 3/34*     (2006.01)

(52) U.S. Cl.
  CPC ............... *E21B 47/26* (2020.05); *G01V 1/44* (2013.01); *G01V 3/30* (2013.01); *G01V 3/34* (2013.01); *H04B 11/00* (2013.01)

(58) Field of Classification Search
  CPC ........ E21B 47/017; E21B 47/13; E21B 47/26; G01V 1/44; G01V 3/30; G01V 3/34
  See application file for complete search history.

(56) References Cited

U.S. PATENT DOCUMENTS

| | | |
|---|---|---|
| 3,512,407 A | 5/1970 | Zill .................................. 73/152 |
| 3,637,010 A | 1/1972 | Malay et al. .................... 166/51 |
| 3,741,301 A | 6/1973 | Malay et al. .................. 166/191 |
| 3,781,783 A | 12/1973 | Tucker ............................ 340/18 |
| 3,790,930 A | 2/1974 | Lamel et al. .................... 340/18 |
| 3,900,827 A | 8/1975 | Lamel et al. .................... 340/18 |
| 3,906,434 A | 9/1975 | Lamel et al. .................... 340/18 |
| 4,001,773 A | 1/1977 | Lamel et al. .................... 340/18 |
| 4,283,780 A | 8/1981 | Nardi ............................... 367/82 |
| 4,298,970 A | 11/1981 | Shawhan et al. ............... 367/82 |
| 4,302,826 A | 11/1981 | Kent et al. ....................... 367/82 |
| 4,314,365 A | 2/1982 | Peterson et al. ................ 367/82 |
| 4,884,071 A | 11/1989 | Howard ......................... 340/854 |
| 4,962,489 A | 10/1990 | Medlin et al. ................... 367/32 |
| 5,128,901 A | 7/1992 | Drumheller ..................... 367/82 |
| 5,136,613 A | 8/1992 | Dumestre, III .................... 375/1 |
| 5,166,908 A | 11/1992 | Montgomery .................. 367/165 |
| 5,182,946 A | 2/1993 | Boughner et al. ............... 73/151 |
| 5,234,055 A | 8/1993 | Cornette ....................... 166/278 |
| 5,283,768 A | 2/1994 | Rorden ............................ 367/83 |
| 5,373,481 A | 12/1994 | Orban et al. .................... 367/82 |
| 5,468,025 A | 11/1995 | Adinolfe et al. ............... 285/114 |
| 5,480,201 A | 1/1996 | Mercer ....................... 294/67.31 |
| 5,495,230 A | 2/1996 | Lian .............................. 340/551 |
| 5,562,240 A | 10/1996 | Campbell ....................... 227/130 |
| 5,592,438 A | 1/1997 | Rorden et al. .................. 367/83 |
| 5,667,650 A | 9/1997 | Face et al. .................. 204/298.07 |
| 5,850,369 A | 12/1998 | Rorden et al. .................. 367/83 |
| 5,857,146 A | 1/1999 | Kido ............................. 455/38.3 |
| 5,924,499 A | 7/1999 | Birchak et al. ................. 175/40 |
| 5,960,883 A | 10/1999 | Tubel et al. ................... 166/313 |
| 5,995,449 A | 11/1999 | Green et al. ..................... 367/83 |
| 6,049,508 A | 4/2000 | Deflandre ........................ 367/48 |
| 6,125,080 A | 9/2000 | Sonnenschein et al. ..... 367/134 |
| 6,128,250 A | 10/2000 | Reid et al. ..................... 367/153 |
| 6,177,882 B1 | 1/2001 | Ringgenberg et al. ..... 340/853.7 |
| 6,236,850 B1 | 5/2001 | Desai ............................. 455/343 |
| 6,239,690 B1 | 5/2001 | Burbidge et al. ........... 340/10.33 |
| 6,252,464 B1 * | 6/2001 | Richards ............. H03C 3/0941 327/107 |
| 6,300,743 B1 | 10/2001 | Patino et al. ................... 320/106 |
| 6,320,820 B1 | 11/2001 | Gardner et al. ................. 367/81 |
| 6,324,904 B1 | 12/2001 | Ishikawa et al. .......... 73/152.03 |
| 6,360,769 B1 | 3/2002 | Brisco ............................ 137/268 |
| 6,394,184 B2 | 5/2002 | Tolman et al. ................ 166/281 |
| 6,400,646 B1 | 6/2002 | Shah et al. ...................... 367/82 |
| 6,429,784 B1 | 8/2002 | Beique et al. .............. 340/853.2 |
| 6,462,672 B1 | 10/2002 | Besson ........................ 340/853.2 |
| 6,543,538 B2 | 4/2003 | Tolman et al. ................ 166/284 |
| 6,670,880 B1 | 12/2003 | Hall et al. ..................... 336/132 |
| 6,679,332 B2 | 1/2004 | Vinegar et al. ................ 166/373 |
| 6,695,277 B1 | 2/2004 | Gallis ............................. 241/191 |
| 6,702,019 B2 | 3/2004 | Dusterhoft et al. ........... 166/278 |
| 6,717,501 B2 | 4/2004 | Hall et al. ..................... 336/132 |
| 6,727,827 B1 | 4/2004 | Edwards et al. ............ 340/854.9 |
| 6,772,837 B2 | 8/2004 | Dusterhoft et al. ........... 166/278 |
| 6,816,082 B1 | 11/2004 | Laborde ...................... 340/853.3 |
| 6,868,037 B2 | 3/2005 | Dasgupta et al. ............... 367/54 |
| 6,880,634 B2 | 4/2005 | Gardner et al. ......... 166/250.01 |
| 6,883,608 B2 | 4/2005 | Parlar et al. ................... 166/278 |
| 6,899,178 B2 | 5/2005 | Tubel .............................. 166/313 |
| 6,909,667 B2 | 6/2005 | Shah et al. ....................... 367/83 |
| 6,912,177 B2 | 6/2005 | Smith ............................... 367/82 |
| 6,920,085 B2 | 7/2005 | Finke et al. ..................... 367/83 |
| 6,930,616 B2 | 8/2005 | Tang et al. .................... 340/854.4 |
| 6,940,392 B2 | 9/2005 | Chan et al. .................... 340/10.4 |
| 6,940,420 B2 | 9/2005 | Jenkins ....................... 340/855.6 |
| 6,953,094 B2 | 10/2005 | Ross et al. ..................... 166/381 |
| 6,956,791 B2 | 10/2005 | Dopf et al. ...................... 367/82 |
| 6,980,929 B2 | 12/2005 | Aronstam et al. ............. 702/188 |
| 6,987,463 B2 | 1/2006 | Beique et al. ............... 340/856.3 |
| 7,006,918 B2 | 2/2006 | Economides et al. ............ 702/1 |
| 7,011,157 B2 | 3/2006 | Costley et al. ................ 166/311 |
| 7,036,601 B2 | 5/2006 | Berg et al. ..................... 166/385 |
| 7,051,812 B2 | 5/2006 | McKee et al. .............. 166/305.1 |
| 7,064,676 B2 | 6/2006 | Hall et al. ................... 350/853.1 |
| 7,082,993 B2 | 8/2006 | Ayoub et al. ............... 166/250.1 |
| 7,090,020 B2 | 8/2006 | Hill et al. ...................... 166/373 |
| 7,140,434 B2 | 11/2006 | Chouzenoux et al. .. 166/250.11 |
| 7,219,762 B2 | 5/2007 | James et al. ................... 181/105 |
| 7,224,288 B2 | 5/2007 | Hall et al. .................... 340/853.7 |
| 7,228,902 B2 | 6/2007 | Oppelt ...................... 166/250.02 |
| 7,249,636 B2 | 7/2007 | Ohmer ............................ 166/383 |
| 7,252,152 B2 | 8/2007 | LoGiudice et al. ........... 166/386 |
| 7,257,050 B2 | 8/2007 | Stewart et al. .................. 367/82 |
| 7,261,154 B2 | 8/2007 | Hall et al. ................... 166/242.2 |
| 7,261,162 B2 | 8/2007 | Deans et al. ................... 166/336 |
| 7,275,597 B2 | 10/2007 | Hall et al. ..................... 166/297 |
| 7,277,026 B2 | 10/2007 | Hall et al. .................... 340/854.8 |
| RE40,032 E | 1/2008 | van Bokhorst et al. ... 455/343.2 |
| 7,317,990 B2 | 1/2008 | Sinha et al. ........................ 702/6 |
| 7,321,788 B2 | 1/2008 | Addy et al. .................... 455/574 |
| 7,322,416 B2 | 1/2008 | Burris, II et al. ........... 166/308.1 |
| 7,325,605 B2 | 2/2008 | Fripp et al. ................ 166/250.01 |
| 7,339,494 B2 | 3/2008 | Shah et al. ................... 340/855.7 |
| 7,348,893 B2 | 3/2008 | Huang et al. ............... 340/854.3 |
| 7,385,523 B2 | 6/2008 | Thomeer et al. ........... 340/854.8 |
| 7,387,165 B2 | 6/2008 | Lopez de Cardenas et al. .......... 166/313 |
| 7,411,517 B2 | 8/2008 | Flanagan .................... 340/854.4 |
| 7,477,160 B2 | 1/2009 | Lemenager et al. ....... 340/853.1 |
| 7,516,792 B2 | 4/2009 | Lonnes et al. ............. 166/308.1 |
| 7,551,057 B2 | 6/2009 | King et al. .................... 340/5.72 |
| 7,590,029 B2 | 9/2009 | Tingley ........................... 367/82 |
| 7,595,737 B2 | 9/2009 | Fink et al. .................. 340/854.4 |
| 7,602,668 B2 | 10/2009 | Liang et al. ..................... 367/25 |
| 7,649,473 B2 | 1/2010 | Johnson et al. ............. 340/853.1 |
| 7,750,808 B2 | 7/2010 | Masino et al. ............... 340/572.1 |
| 7,775,279 B2 | 8/2010 | Marya et al. .................. 166/297 |
| 7,787,327 B2 | 8/2010 | Tang et al. ........................ 367/27 |
| 7,819,188 B2 | 10/2010 | Auzerais et al. .............. 155/250 |
| 7,828,079 B2 | 11/2010 | Oothoudt ......................... 175/20 |
| 7,831,283 B2 | 11/2010 | Ogushi et al. ................. 455/574 |
| 7,913,773 B2 | 3/2011 | Li et al. ............................ 175/40 |
| 7,952,487 B2 | 5/2011 | Montebovi .................. 340/636.1 |
| 7,994,932 B2 | 8/2011 | Huang et al. ............... 340/854.3 |
| 8,004,421 B2 | 8/2011 | Clark ............................ 340/854.4 |
| 8,044,821 B2 | 10/2011 | Mehta .......................... 340/855.7 |
| 8,049,506 B2 | 11/2011 | Lazarev ......................... 324/333 |
| 8,115,651 B2 | 2/2012 | Camwell et al. ........... 340/853.2 |
| 8,117,907 B2 | 2/2012 | Han et al. .................... 73/152.58 |
| 8,157,008 B2 | 4/2012 | Lilley .......................... 166/253.1 |
| 8,162,050 B2 | 4/2012 | Roddy et al. ............... 166/253.1 |
| 8,220,542 B2 | 7/2012 | Whitsitt et al. ............... 166/278 |
| 8,237,585 B2 | 8/2012 | Zimmerman ............... 340/854.6 |
| 8,242,928 B2 | 8/2012 | Prammer ..................... 340/853.7 |
| 8,276,674 B2 | 10/2012 | Lopez de Cardenas et al. .......... 166/373 |
| 8,284,075 B2 | 10/2012 | Fincher et al. ............. 340/854.4 |
| 8,284,947 B2 | 10/2012 | Giesbrecht et al. ............. 381/66 |
| 8,316,936 B2 | 11/2012 | Roddy et al. ............... 166/253.1 |
| 8,330,617 B2 | 12/2012 | Chen et al. .................. 340/854.6 |
| 8,347,982 B2 | 1/2013 | Hannegan et al. ................ 175/5 |

(56) References Cited

U.S. PATENT DOCUMENTS

| | | | |
|---|---|---|---|
| 8,358,220 B2 | 1/2013 | Savage | 340/853.1 |
| 8,376,065 B2 | 2/2013 | Teodorescu et al. | 175/40 |
| 8,381,822 B2 | 2/2013 | Hales et al. | 166/377 |
| 8,388,899 B2 | 3/2013 | Mitani et al. | 422/179 |
| 8,411,530 B2 | 4/2013 | Slocum et al. | 367/90 |
| 8,434,354 B2 | 5/2013 | Crow et al. | 73/152.04 |
| 8,494,070 B2 | 7/2013 | Luo et al. | 375/262 |
| 8,496,055 B2 | 7/2013 | Mootoo et al. | 166/278 |
| 8,539,890 B2 | 9/2013 | Tripp et al. | 109/25 |
| 8,544,564 B2 | 10/2013 | Moore et al. | 175/50 |
| 8,552,597 B2 | 10/2013 | Song et al. | 307/149 |
| 8,556,302 B2 | 10/2013 | Dole | 285/367 |
| 8,559,272 B2 | 10/2013 | Wang | |
| 8,596,359 B2 | 12/2013 | Grigsby et al. | 166/278 |
| 8,605,548 B2 | 12/2013 | Froelich | 367/82 |
| 8,607,864 B2 | 12/2013 | Mcleod et al. | 166/250.1 |
| 8,664,958 B2 | 3/2014 | Simon | 324/338 |
| 8,672,875 B2 | 3/2014 | Vanderveen et al. | 604/67 |
| 8,675,779 B2 | 3/2014 | Zeppetelle et al. | 375/340 |
| 8,683,859 B2 | 4/2014 | Godager | 73/152.54 |
| 8,689,621 B2 | 4/2014 | Godager | 73/152.54 |
| 8,701,480 B2 | 4/2014 | Eriksen | 73/152.51 |
| 8,750,789 B2 | 6/2014 | Baldemair et al. | 455/11.1 |
| 8,787,840 B2 | 7/2014 | Srinivasan et al. | 455/69 |
| 8,805,632 B2 | 8/2014 | Coman et al. | 702/89 |
| 8,826,980 B2 | 9/2014 | Neer | 166/255.1 |
| 8,833,469 B2 | 9/2014 | Purkis | 166/373 |
| 8,893,784 B2 | 11/2014 | Abad | E21B 43/26 |
| 8,910,716 B2 | 12/2014 | Newton et al. | 166/373 |
| 8,994,550 B2 | 3/2015 | Millot et al. | E21B 47/16 |
| 8,995,837 B2 | 3/2015 | Mizuguchi et al. | H04B 10/27 |
| 9,062,508 B2 | 6/2015 | Huval et al. | E21B 47/122 |
| 9,062,531 B2 | 6/2015 | Jones | E21B 47/082 |
| 9,075,155 B2 | 7/2015 | Luscombe et al. | G01V 1/226 |
| 9,078,055 B2 | 7/2015 | Nguyen et al. | H04R 5/00 |
| 9,091,153 B2 | 7/2015 | Yang et al. | E21B 47/16 |
| 9,133,705 B2 | 9/2015 | Angeles Boza | E21B 47/12 |
| 9,140,097 B2 | 9/2015 | Themig et al. | E21B 34/12 |
| 9,144,894 B2 | 9/2015 | Barnett et al. | B25B 17/00 |
| 9,206,645 B2 | 12/2015 | Hallundbaek | E21B 7/04 |
| 9,279,301 B2 | 3/2016 | Lovorn et al. | E21B 21/103 |
| 9,284,834 B2 | 3/2016 | Alteirac et al. | E21B 47/12 |
| 9,310,510 B2 | 4/2016 | Godager | G01V 3/38 |
| 9,333,350 B2 | 5/2016 | Rise et al. | A61N 1/36082 |
| 9,334,696 B2 | 5/2016 | Hay | E21B 47/12 |
| 9,359,841 B2 | 6/2016 | Hall | E21B 23/00 |
| 9,363,605 B2 | 6/2016 | Goodman et al. | H04R 17/00 |
| 9,376,908 B2 | 6/2016 | Ludwig et al. | E21B 47/01 |
| 9,441,470 B2 | 9/2016 | Guerrero et al. | E21B 43/14 |
| 9,515,748 B2 | 12/2016 | Jeong et al. | G10L 25/90 |
| 9,557,434 B2 | 1/2017 | Keller et al. | G01V 1/52 |
| 9,617,829 B2 | 4/2017 | Dale et al. | E21B 41/00 |
| 9,617,850 B2 | 4/2017 | Fripp et al. | E21B 47/18 |
| 9,631,485 B2 | 4/2017 | Keller et al. | E21B 47/16 |
| 9,657,564 B2 | 5/2017 | Stolpman | E21B 47/16 |
| 9,664,037 B2 | 5/2017 | Logan et al. | E21B 47/122 |
| 9,670,773 B2 | 6/2017 | Croux | E21B 47/16 |
| 9,683,434 B2 | 6/2017 | Machocki | E21B 44/00 |
| 9,686,021 B2 | 6/2017 | Merino | E21B 47/16 |
| 9,715,031 B2 | 7/2017 | Contant et al. | E21B 47/122 |
| 9,721,448 B2 | 8/2017 | Wu | G08B 21/20 |
| 9,759,062 B2 | 9/2017 | Deffenbaugh et al. | E21B 47/16 |
| 9,816,373 B2 | 11/2017 | Howell et al. | E21B 47/16 |
| 9,822,634 B2 | 11/2017 | Gao | E21B 47/16 |
| 9,863,222 B2 | 1/2018 | Morrow et al. | E21B 43/122 |
| 9,879,525 B2 | 1/2018 | Morrow et al. | E21B 47/12 |
| 9,945,204 B2 | 4/2018 | Ross et al. | E21B 33/127 |
| 9,963,955 B2 | 5/2018 | Tolman et al. | E21B 43/119 |
| 10,100,635 B2 | 10/2018 | Keller et al. | E21B 47/18 |
| 10,103,846 B2 | 10/2018 | van Zelm et al. | E21B 47/12 |
| 10,132,149 B2 | 11/2018 | Morrow et al. | E21B 43/267 |
| 10,145,228 B2 | 12/2018 | Yarus et al. | E21B 44/00 |
| 10,167,716 B2 | 1/2019 | Clawson et al. | E21B 47/14 |
| 10,167,717 B2 | 1/2019 | Deffenbaugh et al. | E21B 47/16 |
| 10,190,410 B2 | 1/2019 | Clawson et al. | E21B 47/14 |
| 10,196,862 B2 | 2/2019 | Li-Leger et al. | E21B 17/02 |
| 2002/0180613 A1 | 12/2002 | Shi et al. | E21B 47/18 |
| 2003/0056953 A1 | 3/2003 | Tumlin et al. | 166/298 |
| 2003/0117896 A1 | 6/2003 | Sakuma et al. | 367/81 |
| 2004/0020063 A1 | 2/2004 | Lewis et al. | 33/313 |
| 2004/0200613 A1 | 10/2004 | Fripp et al. | 166/250.01 |
| 2004/0239521 A1 | 12/2004 | Zierolf | 340/854.1 |
| 2005/0269083 A1 | 12/2005 | Burris, II et al. | 166/255.2 |
| 2005/0284659 A1 | 12/2005 | Hall et al. | 175/27 |
| 2006/0001549 A1* | 1/2006 | Shah | G01V 11/002 340/854.4 |
| 2006/0033638 A1 | 2/2006 | Hall et al. | 340/854.6 |
| 2006/0041795 A1 | 2/2006 | Gabelmann et al. | 714/699 |
| 2006/0090893 A1 | 5/2006 | Sheffield | 166/250.15 |
| 2007/0139217 A1 | 6/2007 | Beique et al. | 340/856.3 |
| 2007/0146351 A1 | 6/2007 | Katsurahira et al. | 345/179 |
| 2007/0156359 A1 | 7/2007 | Varsamis et al. | 702/69 |
| 2007/0219758 A1 | 9/2007 | Bloomfield | 702/190 |
| 2007/0272411 A1 | 11/2007 | Lopez de Cardenas et al. | 166/305.1 |
| 2008/0030365 A1 | 2/2008 | Fripp et al. | E21B 47/16 |
| 2008/0110644 A1 | 5/2008 | Howell et al. | 166/387 |
| 2008/0185144 A1 | 8/2008 | Lovell | 166/250.17 |
| 2008/0304360 A1 | 12/2008 | Mozer | 367/117 |
| 2009/0003133 A1 | 1/2009 | Dalton et al. | 367/82 |
| 2009/0030614 A1 | 1/2009 | Carnegie et al. | 702/6 |
| 2009/0034368 A1 | 2/2009 | Johnson | 367/83 |
| 2009/0045974 A1 | 2/2009 | Patel | 340/854.6 |
| 2009/0080291 A1 | 3/2009 | Tubel et al. | 367/81 |
| 2009/0166031 A1 | 7/2009 | Hernandez | 166/250.01 |
| 2010/0013663 A1 | 1/2010 | Cavender et al. | 340/854.3 |
| 2010/0089141 A1 | 4/2010 | Rioufol et al. | 73/152.2 |
| 2010/0133004 A1 | 6/2010 | Burleson et al. | 175/2 |
| 2010/0182161 A1 | 7/2010 | Robbins et al. | 340/853.7 |
| 2010/0212891 A1 | 8/2010 | Stewart et al. | 166/250.12 |
| 2010/0303185 A1* | 12/2010 | Haartsen | H04W 52/0216 375/362 |
| 2011/0026567 A1* | 2/2011 | Sampath | H04B 1/0032 375/219 |
| 2011/0061862 A1 | 3/2011 | Loretz et al. | 166/250.11 |
| 2011/0066378 A1 | 3/2011 | Lerche et al. | 702/6 |
| 2011/0168403 A1 | 7/2011 | Patel | 166/373 |
| 2011/0188345 A1 | 8/2011 | Wang | 367/34 |
| 2011/0297376 A1 | 12/2011 | Holderman et al. | 166/278 |
| 2011/0297673 A1 | 12/2011 | Zbat et al. | 219/756 |
| 2011/0301439 A1 | 12/2011 | Albert et al. | 600/301 |
| 2011/0315377 A1 | 12/2011 | Rioufol | |
| 2012/0043079 A1 | 2/2012 | Wassouf et al. | 166/250 |
| 2012/0126992 A1 | 5/2012 | Rodney et al. | 340/850 |
| 2012/0152562 A1 | 6/2012 | Newton et al. | 166/369 |
| 2012/0179377 A1 | 7/2012 | Lie | 702/6 |
| 2013/0000981 A1 | 1/2013 | Grimmer et al. | 175/45 |
| 2013/0003503 A1 | 1/2013 | L'Her et al. | 367/106 |
| 2013/0106615 A1 | 5/2013 | Prammer | 340/854.6 |
| 2013/0138254 A1 | 5/2013 | Seals et al. | 700/282 |
| 2013/0146279 A1* | 6/2013 | Chang | E21B 47/12 166/244.1 |
| 2013/0192823 A1 | 8/2013 | Barrilleaux et al. | 166/250.01 |
| 2013/0197810 A1* | 8/2013 | Haas | G01V 9/00 702/12 |
| 2013/0278432 A1 | 10/2013 | Shashoua et al. | 340/853.7 |
| 2013/0319102 A1* | 12/2013 | Ringgenberg | E21B 49/10 73/152.28 |
| 2013/0341094 A1* | 12/2013 | Taherian | E21B 21/08 175/40 |
| 2014/0060840 A1 | 3/2014 | Hartshorne et al. | 166/300 |
| 2014/0062715 A1 | 3/2014 | Clark | 340/853.2 |
| 2014/0102708 A1 | 4/2014 | Purkis et al. | 166/308.5 |
| 2014/0133276 A1 | 5/2014 | Volker et al. | 367/82 |
| 2014/0152659 A1 | 6/2014 | Davidson et al. | 345/420 |
| 2014/0153368 A1 | 6/2014 | Bar-Cohen et al. | 367/81 |
| 2014/0166266 A1 | 6/2014 | Read | 166/250.01 |
| 2014/0170025 A1 | 6/2014 | Weiner et al. | 422/82.01 |
| 2014/0266769 A1 | 9/2014 | van Zelm | 340/854.3 |
| 2014/0327552 A1 | 11/2014 | Filas et al. | 340/854.6 |

(56) References Cited

U.S. PATENT DOCUMENTS

| | | | |
|---|---|---|---|
| 2014/0352955 A1 | 12/2014 | Tubel et al. | 166/250.15 |
| 2015/0003202 A1 | 1/2015 | Palmer et al. | 367/82 |
| 2015/0009040 A1 | 1/2015 | Bowles et al. | 340/854.6 |
| 2015/0027687 A1 | 1/2015 | Tubel | 166/72 |
| 2015/0041124 A1 | 2/2015 | Rodriguez | 166/255.1 |
| 2015/0041137 A1 | 2/2015 | Rodriguez | 166/301 |
| 2015/0152727 A1 | 6/2015 | Fripp et al. | E21B 47/14 |
| 2015/0159481 A1 | 6/2015 | Mebarkia et al. | E21B 47/065 |
| 2015/0167425 A1 | 6/2015 | Hammer et al. | E21B 34/06 |
| 2015/0176370 A1 | 6/2015 | Greening et al. | E21B 41/00 |
| 2015/0292319 A1 | 10/2015 | Disko et al. | E21B 47/16 |
| 2015/0292320 A1 | 10/2015 | Lynk et al. | E21B 47/16 |
| 2015/0300159 A1 | 10/2015 | Stiles et al. | E21B 47/16 |
| 2015/0330200 A1 | 11/2015 | Richard et al. | E21B 44/00 |
| 2015/0337642 A1 | 11/2015 | Spacek | E21B 44/005 |
| 2015/0354351 A1 | 12/2015 | Morrow et al. | E21B 47/16 |
| 2015/0377016 A1 | 12/2015 | Ahmad | E21B 47/122 |
| 2016/0010446 A1 | 1/2016 | Logan et al. | E21B 47/122 |
| 2016/0047230 A1 | 2/2016 | Livescu et al. | E21B 47/10 |
| 2016/0047233 A1 | 2/2016 | Butner et al. | E21B 47/12 |
| 2016/0076363 A1 | 3/2016 | Morrow et al. | E21B 47/12 |
| 2016/0109606 A1 | 4/2016 | Market et al. | G01V 1/50 |
| 2016/0131781 A1* | 5/2016 | Sun | G01V 1/306 367/7 |
| 2016/0215612 A1 | 7/2016 | Morrow | E21B 47/122 |
| 2017/0138185 A1 | 5/2017 | Saed et al. | E21B 47/16 |
| 2017/0145811 A1 | 5/2017 | Robison et al. | E21B 47/0007 |
| 2017/0152741 A1 | 6/2017 | Park et al. | E21B 47/123 |
| 2017/0167249 A1 | 6/2017 | Lee et al. | E21B 47/14 |
| 2017/0204719 A1 | 7/2017 | Babakhani | E21B 47/0005 |
| 2017/0254183 A1 | 9/2017 | Vasques et al. | E21B 47/16 |
| 2017/0293044 A1 | 10/2017 | Gilstrap et al. | G01V 1/50 |
| 2017/0314386 A1 | 11/2017 | Orban et al. | E21B 47/091 |
| 2018/0010449 A1 | 1/2018 | Roberson et al. | E21B 47/16 |
| 2018/0058191 A1 | 3/2018 | Romer et al. | E21B 47/0007 |
| 2018/0058198 A1 | 3/2018 | Ertas et al. | E21B 47/12 |
| 2018/0058202 A1 | 3/2018 | Disko et al. | E21B 47/14 |
| 2018/0058203 A1 | 3/2018 | Clawson et al. | E21B 47/14 |
| 2018/0058204 A1 | 3/2018 | Clawson et al. | E21B 47/14 |
| 2018/0058205 A1 | 3/2018 | Clawson et al. | E21B 47/14 |
| 2018/0058206 A1 | 3/2018 | Zhang et al. | E21B 47/16 |
| 2018/0058207 A1 | 3/2018 | Song et al. | E21B 47/16 |
| 2018/0058208 A1 | 3/2018 | Song et al. | E21B 47/16 |
| 2018/0058209 A1 | 3/2018 | Song et al. | E21B 47/16 |
| 2018/0066490 A1 | 3/2018 | Kjos | E21B 33/035 |
| 2018/0066510 A1 | 3/2018 | Walker et al. | E21B 47/011 |
| 2019/0049614 A1* | 2/2019 | Griffing | G01V 3/38 |

FOREIGN PATENT DOCUMENTS

| | | | |
|---|---|---|---|
| EP | 1409839 | 4/2005 | E21B 43/1185 |
| EP | 2677698 | 12/2013 | H04L 12/28 |
| WO | WO2002/027139 | 4/2002 | E21B 43/12 |
| WO | WO2010/074766 | 7/2010 | A41C 1/14 |
| WO | WO2013/079928 | 6/2013 | E21B 47/12 |
| WO | WO2014/018010 | 1/2014 | E21B 47/12 |
| WO | WO2014/049360 | 4/2014 | E21B 47/12 |
| WO | WO2014/100271 | 6/2014 | E21B 47/12 |
| WO | WO2014/134741 | 9/2014 | E21B 47/13 |
| WO | WO2015/117060 | 8/2015 | E21B 47/12 |

OTHER PUBLICATIONS

U.S. Appl. No. 16/139,373, filed Sep. 24, 2018, Yi, Xiaohua et al.
U.S. Appl. No. 16/139,384, filed Oct. 13, 2017, Disko, Mark M. et al.
U.S. Appl. No. 16/139,394, filed Oct. 13, 2017, Song, Limin et al.
U.S. Appl. No. 16/139,403, filed Oct. 13, 2017, Song, Limin et al.
U.S. Appl. No. 16/139,414, filed Oct. 13, 2017, Zhang, Yibing et al.
U.S. Appl. No. 16/139,421, filed Oct. 13, 2017, Song, Limin et al.
U.S. Appl. No. 16/139,427, filed Oct. 13, 2017, Disko, Mark M. et al.
U.S. Appl. No. 16/175,418, filed Oct. 30, 2018, Kent, David K. et al.
U.S. Appl. No. 62/588,067, filed Nov. 17, 2017, Song, Limin et al.
U.S. Appl. No. 62/588,080, filed Nov. 17, 2017, Kinn, Timothy F. et al.
U.S. Appl. No. 62/588,103, filed Nov. 17, 2017, Yi, Xiaohua et al.
Arroyo, Javier et al. (2009) "Forecasting Histogram Time Series with K-Nearest Neighbours Methods," *International Journal of Forecasting*, v.25, pp. 192-207.
Arroyo, Javier et al. (2011) "Smoothing Methods for Histogram-Valued Time Seriers: An Application to Value-at-Risk," *Univ. of California, Dept. of Economics*, www.wileyonlinelibrary.com, Mar. 8, 2011, 28 pages.
Arroyo, Javier et al. (2011) "Forecasting with Interval and Histogram Data Some Financial Applications," *Univ. of California, Dept. of Economics*, 46 pages.
Emerson Process Management (2011), "Roxar downhole Wireless PT sensor system," www.roxar.com, or downhole@roxar.com, 2 pgs.
Gonzalez-Rivera, Gloria et al. (2012) "Time Series Modeling of Histogram-Valued Data: The Daily Histogram Time Series of S&P500 Intradaily Returns," *International Journal of Forecasting*, v.28, 36 pgs.
Gutierrez-Estevez, M. A. et al. (2013) "Acoustic Boardband Communications Over Deep Drill Strings using Adaptive OFDM", *IEEE Wireless Comm. & Networking Conf.*, pp. 4089-4094.
Qu, X. et al. (2011) "Reconstruction fo Self-Sparse 20 NMR Spectra From undersampled Data in the Indirect Dimension", pp. 8888-8909.
U.S. Department of Defense (1999) "Interoperability and Performance Standards for Medium and High Frequency Radio Systems," *MIL-STD-188-141B*, Mar. 1, 1999, 584 pages.

* cited by examiner

METHOD AND SYSTEM FOR PERFORMING COMMUNICATIONS USING ALIASING

CROSS REFERENCE TO RELATED APPLICATION

This application claims the priority benefit of U.S. Provisional Application No. 62/572,142, filed Oct. 13, 2017 entitled "Method and System for Performing Communications Using Aliasing," the entirety of which is incorporated herein.

This application is related to U.S. Provisional Application Ser. No. 62/428,367, filed Nov. 30, 2016, entitled "Dual Transducer Communications Node for Downhole Acoustic Wireless Networks and Method Employing Same," U.S. Patent application Ser. No. 15/666,292, filed Aug. 1, 2017, titled "Dual Transducer Communications Node For Downhole Acoustic Wireless Networks and Method Employing Same," U.S. Provisional Application Ser. No. 62/381,330, filed Aug. 30, 2016, entitled "Communication Networks, Relay Nodes for Communication Networks, and Methods of Transmitting Data Among a Plurality of Relay Nodes," U.S. patent application Ser. No. 15/665,931, filed Aug. 1, 2017, entitled "Communication Networks, Relay Nodes for Communication Networks, and Methods of Transmitting Data Among a Plurality of Relay Nodes," U.S. Provisional Application Ser. No. 62/428,374, filed Nov. 30, 2016, entitled "Hybrid Downhole Acoustic Wireless Network," U.S. patent application Ser. No. 15/666,299, filed Aug. 1, 2017, entitled "Hybrid Downhole Acoustic Wireless Network," U.S. Provisional Application Ser. No. 62/428,385, filed Nov. 30, 2016 entitled "Methods of Acoustically Communicating And Wells That Utilize The Methods," U.S. Provisional Application Ser. No. 62/433,491, filed Dec. 13, 2016 entitled "Methods of Acoustically Communicating And Wells That Utilize The Methods," U.S. patent application Ser. No. 15/666,324, filed Aug. 1, 2017 entitled "Methods of Acoustically Communicating and Wells that Utilize the Methods," U.S. Provisional Application Ser. No. 62/428,394, filed Nov. 30, 2016, entitled "Downhole Multiphase Flow Sensing Methods," U.S. patent application Ser. No. 15/666,328, filed Aug. 1, 2017, entitled "Downhole Multiphase Flow Sensing Methods," U.S. Provisional Application Ser. No. 62/428,425 filed Nov. 30, 2016, entitled "Acoustic Housing for Tubulars," U.S. patent application Ser. No. 15/666,334 filed Aug. 1, 2017 entitled "Acoustic Housing for Tubulars" and U.S. patent application Ser. No. 15/689,182 filed Aug. 29, 2017, entitled "Acoustic Housing for Tubulars," the disclosures of which are incorporated herein by reference in their entireties.

This application is related to U.S. Provisional Applications having common inventors and assignee and filed on an even date herewith, U.S. Provisional Application No. 62/572,146, filed Oct. 13, 2017 entitled "Method and System For Performing Operations Using Communications," (2017EMEM250), U.S. Provisional Application No. 62/572,142, filed Oct. 13, 2017 entitled "Method And System For Performing Communications Using Aliasing," (2017EM317), U.S. Provisional Application No. 62/572,147, filed Oct. 13, 2017 entitled "Method and System For Performing Operations With Communications," (2017EM251), U.S. Provisional Application No. 62/572,201, filed Oct. 13, 2017 entitled "Method And System For Performing Wireless Communications Along A Drilling String," (2017EM326), U.S. Provisional Application No. 62/572,211 filed Oct. 13, 2017 entitled "Method and System for Performing Hydrocarbon Operations With Mixed Communication Networks", (2017EM252), U.S. Provisional Application No. 62/572,201 filed Oct. 13, 2017 entitled "Dual Transducer Communications Node Including Piezo Pre-Tensioning for Acoustic Wireless Networks and Method Employing Same," (2017EM326) and U.S. Provisional Application No. 62/572,152 filed Oct. 13, 2017 entitled "Method And System For Performing Wireless Communications Along A Drilling String" the disclosures of which are incorporated herein by reference in their entireties.

FIELD OF THE INVENTION

This disclosure relates generally to the field of communicating with communication nodes using aliasing. Specifically, the disclosure relates to methods and systems for acoustically communicating with communication nodes disposed along one or more tubular members, such as along casing or tubing within a wellbore, along a subsea conduit and/or along a pipeline, to enhance associated operations, such as hydrocarbon exploration, hydrocarbon development, and/or hydrocarbon production.

BACKGROUND

This section is intended to introduce various aspects of the art, which may be associated with exemplary embodiments of the present disclosure. This discussion is believed to assist in providing a framework to facilitate a better understanding of particular aspects of the present invention. Accordingly, it should be understood that this section should be read in this light, and not necessarily as admissions of prior art.

The exchange of information may be used to manage the operations. By way of example, several real-time data systems or methods have been proposed in hydrocarbon exploration, hydrocarbon development, and/or hydrocarbon production operations. To exchange information, the devices may communicate with physical or wired connections or wireless connections. As a first example, a physical connection, such as a cable, an electrical conductor or a fiber optic cable, is secured to a tubular member, which may be used to evaluate subsurface conditions. The cable may be secured to an inner portion of the tubular member and/or an outer portion of the tubular member. The cable provides a hard wire connection to provide real-time transmission of data. Further, the cables may be used to provide high data transmission rates and the delivery of electrical power directly to downhole devices, such as sensors. However, the use of physical cables may be difficult as the cables have to be unspooled and attached to the tubular member sections disposed within a wellbore. As a result, the cables may be damaged by other operations within the wellbore and/or may be damaged during installation of the tubular members (e.g., in installations that involve rotating the tubular members). Further, passages have to be provided in certain downhole equipment to provide a physical path for the cables. These passages introduce additional potential failure points, and may have to be provided in equipment not even associated with the communication network, which may increase costs for hydrocarbon operations.

As an alternative to physical connection or hard-wired configurations, wireless connections or technologies may be used for downhole communications. Such technologies are referred to as wireless telemetry. A wireless network may include various communication nodes that exchange information with each other to manage data communication within the wellbore. In addition, a computer system may also be in communication with the wireless network to manage the hydrocarbon operations from a surface location. To operate, the communication nodes may involve different wireless network types. As a first example, radio transmissions may be used for wellbore communications. However, the use of radio transmissions may be impractical or unavailable in certain environments or during certain operations. Other systems may use an acoustic wireless network to transmit an acoustic signal, such as a vibration, via a tone transmission medium. In general, a given tone transmission medium may only permit communication within a certain frequency range; and, in some systems, this frequency range may be relatively small. Such systems may be referred to herein as spectrum-constrained systems. An example of a spectrum-constrained system is a well, such as a hydrocarbon well, that includes a plurality of communication nodes spaced-apart along a length of tubular members thereof.

While the communication networks may be beneficial, conventional data transmission mechanisms may not be effective and may be problematic to operate in certain environments. Indeed, the downhole environment may include conditions within the wellbore that are unknown and unpredictable. The acoustic conditions within the wellbore may be influenced by formation variations, cementation variations, and/or varying fluid compositions (e.g., gas, water and oil), which may change at different locations or regions within the wellbore. In addition, the communication exchanging may be further complicated because of changes that result from hydrocarbon operations (e.g., following fracking operations). Thus, the downhole environment may vary over the time period that the wireless network is deployed for hydrocarbon operations. Similar challenging conditions may be present with pipelines and subsea conduits.

In addition to the communication problems, the communication nodes may face problems with power usage within the environment. By way of example, conventional acoustic communication devices are configured to avoid aliasing, which includes using an effective clock speed that exceeds two times the frequency of the wireless telemetry signal (e.g., a high-frequency clock processor). For example, the effective clock speed for a high-frequency clock processor may be at least 500 kilohertz (kHz) and more commonly as high as 100 megahertz (MHz). As digital processors consume energy at a rate proportional to processor clock speed, the clock speed of the processor may increase the size of the structure for the communication node to accommodate additional batteries needed to supply the power. In addition, the processors that use higher clock speeds may generate more heat, which may adversely affect reliability in the operations and/or interfere with certain sensor measurements. Accordingly, the processors operating at higher effective clock speeds may limit the ability to create a compact communication node. This limitation may result in the communication node not being practical for use in areas of limited clearance. Further, the larger consumption of power reduces the operational life, which limits the overall utility of the communication node. As a result, the processors operating at higher clock speeds may be problematic for the communication networks.

Accordingly, there remains a need in the industry for methods and systems that are more efficient and may lessen problems associated with noisy and ineffective communication. Further, a need remains for efficient approaches to perform acoustic communications along a tubular member, which may utilize aliasing to enhance the communication within the wellbore or along a subsea conduit and/or along a pipeline. The present techniques provide methods and systems that overcome one or more of the deficiencies discussed above.

SUMMARY

In one embodiment, a method for communicating data among a plurality of communication nodes, which may be disposed along a wave propagation channel, acoustic channel, a communication medium, and/or along one or more tubular members, is described. The method comprising: creating a communication network, wherein the communication network comprises a plurality of communication nodes, wherein each of the plurality of communication nodes are configured to utilize aliased frequencies in one or more signals to communicate between two or more of the plurality of communication nodes; configuring the plurality of communication nodes; communicating operational data between two or more of the plurality of communication nodes, wherein the communicating the operational data is at least partially based on the aliased signals; and performing operations, which may include hydrocarbon operations, based on the operational data. The method may further include disposing the plurality of communication nodes along the one or more tubular members.

In another embodiment, the system for communicating along one or more tubular members is described. The system may comprise: one or more tubular members; a communication network coupled to the one or more tubular members, wherein the communication network comprises a plurality of communication nodes, wherein each of the plurality of communication nodes are configured to: communicate operational data between two or more of the plurality of communication nodes, wherein the communication of the operational data is at least partially based on the use of aliased signals; and perform operations, which may include hydrocarbon operations, based on the operational data.

BRIEF DESCRIPTION OF THE DRAWINGS

The advantages of the present invention are better understood by referring to the following detailed description and the attached drawings.

DETAILED DESCRIPTION

Figure 1:
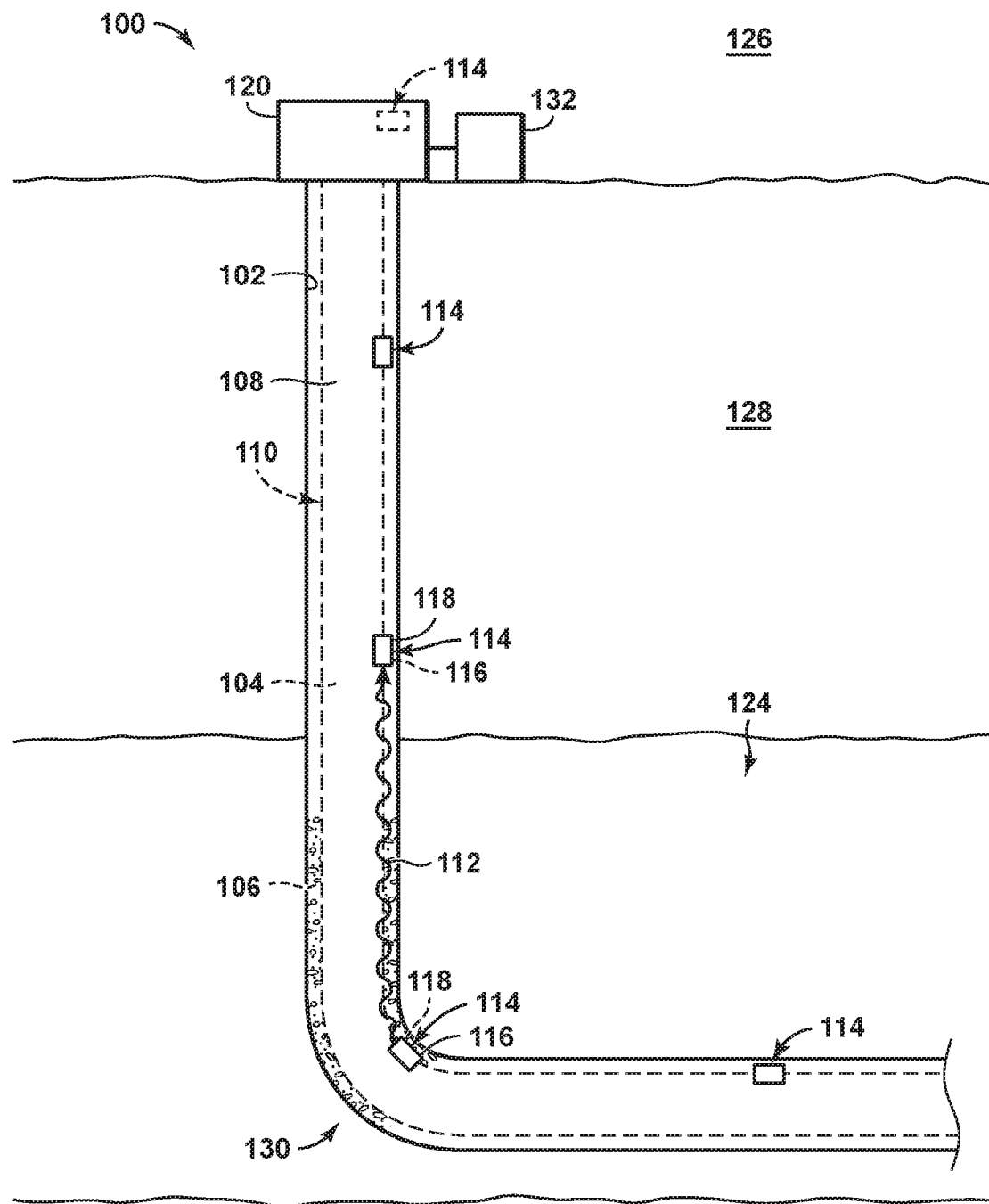
FIG. 1 is a schematic representation of a well configured to utilize the methods according to the present disclosure.

In the following detailed description section, the specific embodiments of the present disclosure are described in connection with preferred embodiments. However, to the extent that the following description is specific to a particular embodiment or a particular use of the present disclosure, this is intended to be for exemplary purposes only and simply provides a description of the exemplary embodiments. Accordingly, the disclosure is not limited to the specific embodiments described below, but rather, it includes all alternatives, modifications, and equivalents falling within the true spirit and scope of the appended claims.

Various terms as used herein are defined below. To the extent a term used in a claim is not defined below, it should be given the broadest definition persons in the pertinent art have given that term as reflected in at least one printed publication or issued patent.

The articles "the", "a", and "an" are not necessarily limited to mean only one, but rather are inclusive and open ended so as to include, optionally, multiple such elements.

The directional terms, such as "above", "below", "upper", "lower", etc., are used for convenience in referring to the accompanying drawings. In general, "above", "upper", "upward" and similar terms refer to a direction toward the earth's surface along a wellbore, and "below", "lower", "downward" and similar terms refer to a direction away from the earth's surface along the wellbore. Continuing with the example of relative directions in a wellbore, "upper" and "lower" may also refer to relative positions along the longitudinal dimension of a wellbore rather than relative to the surface, such as in describing both vertical and horizontal wells.

As used herein, the term "and/or" placed between a first entity and a second entity means one of (1) the first entity, (2) the second entity, and (3) the first entity and the second entity. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements). As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of".

As used herein, "about" refers to a degree of deviation based on experimental error typical for the particular property identified. The latitude provided the term "about" will depend on the specific context and particular property and can be readily discerned by those skilled in the art. The term "about" is not intended to either expand or limit the degree of equivalents which may otherwise be afforded a particular value. Further, unless otherwise stated, the term "about" shall expressly include "exactly," consistent with the discussion below regarding ranges and numerical data.

As used herein, "any" means one, some, or all indiscriminately of whatever quantity.

As used herein, "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements). The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

As used herein, "based on" does not mean "based only on", unless expressly specified otherwise. In other words, the phrase "based on" describes both "based only on," "based at least on," and "based at least in part on."

As used herein, "conduit" refers to a tubular member forming a physical channel through which something is conveyed. The conduit may include one or more of a pipe, a manifold, a tube or the like, or the liquid contained in the tubular member. Alternately, conduit refers to an acoustic channel of liquid which may, for example, exist between the formation and a tubular.

As used herein, "couple" refers to an interaction between elements and is not meant to limit the interaction to direct interaction between the elements and may also include indirect interaction between the elements described. Couple may include other terms, such as "connect", "engage", "attach", or any other suitable terms.

As used herein, "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

As used herein, "one embodiment," "an embodiment," "some embodiments," "one aspect," "an aspect," "some aspects," "some implementations," "one implementation," "an implementation," or similar construction means that a particular component, feature, structure, method, or characteristic described in connection with the embodiment, aspect, or implementation is included in at least one embodiment and/or implementation of the claimed subject matter.

Thus, the appearance of the phrases "in one embodiment" or "in an embodiment" or "in some embodiments" (or "aspects" or "implementations") in various places throughout the specification are not necessarily all referring to the same embodiment and/or implementation. Furthermore, the particular features, structures, methods, or characteristics may be combined in any suitable manner in one or more embodiments or implementations.

As used herein, "event" is used herein to mean a detection of a change in a communication environment along the tubular member. The event may include a change within a wellbore, a detection of a local failure in communication, a failure to operate properly, a manual trigger, and/or a lapse of a time period.

As used herein, "exemplary" is used exclusively herein to mean "serving as an example, instance, or illustration." Any embodiment described herein as "exemplary" is not necessarily to be construed as preferred or advantageous over other embodiments.

As used herein, "formation" refers to any definable subsurface region. The formation may contain one or more hydrocarbon-containing layers, one or more non-hydrocarbon containing layers, an overburden, and/or an underburden of any geologic formation.

As used herein, "hydrocarbons" are generally defined as molecules formed primarily of carbon and hydrogen atoms such as oil and natural gas. Hydrocarbons may also include other elements or compounds, such as, but not limited to, halogens, metallic elements, nitrogen, oxygen, sulfur, hydrogen sulfide ($H_2S$), and carbon dioxide ($CO_2$). Hydrocarbons may be produced from hydrocarbon reservoirs through wells penetrating a hydrocarbon containing formation. Hydrocarbons derived from a hydrocarbon reservoir may include, but are not limited to, petroleum, kerogen, bitumen, pyrobitumen, asphaltenes, tars, oils, natural gas, or combinations thereof. Hydrocarbons may be located within or adjacent to mineral matrices within the earth, termed reservoirs. Matrices may include, but are not limited to, sedimentary rock, sands, silicilytes, carbonates, diatomites, and other porous media.

As used herein, "hydrocarbon exploration" refers to any activity associated with determining the location of hydrocarbons in subsurface regions. Hydrocarbon exploration normally refers to any activity conducted to obtain measurements through acquisition of measured data associated with the subsurface formation and the associated modeling of the data to identify potential locations of hydrocarbon accumulations. Accordingly, hydrocarbon exploration includes acquiring measurement data, modeling of the measurement data to form subsurface models, and determining the likely locations for hydrocarbon reservoirs within the subsurface. The measurement data may include seismic data, gravity data, magnetic data, electromagnetic data, and the like. The hydrocarbon exploration activities may include drilling exploratory wells.

As used herein, "hydrocarbon development" refers to any activity associated with planning of extraction and/or access to hydrocarbons in subsurface regions. Hydrocarbon development normally refers to any activity conducted to plan for access to and/or for production of hydrocarbons from the subsurface formation and the associated modeling of the data to identify preferred development approaches and methods. By way of example, hydrocarbon development may include modeling of the subsurface formation and extraction planning for periods of production, determining and planning equipment to be utilized and techniques to be utilized in extracting the hydrocarbons from the subsurface formation, and the like.

As used herein, "hydrocarbon fluids" refers to a hydrocarbon or mixtures of hydrocarbons that are gases or liquids. For example, hydrocarbon fluids may include a hydrocarbon or mixtures of hydrocarbons that are gases or liquids at formation conditions, at processing conditions, or at ambient conditions (20° Celsius (C) and 1 atmospheric (atm) pressure). Hydrocarbon fluids may include, for example, oil, natural gas, gas condensates, coal bed methane, shale oil, shale gas, and other hydrocarbons that are in a gaseous or liquid state.

As used herein, "hydrocarbon operations" refers to any activity associated with hydrocarbon exploration, hydrocarbon development, collection of wellbore data, and/or hydrocarbon production. It may also include the midstream pipelines and storage tanks, or the downstream refinery and distribution operations.

As used herein, "hydrocarbon production" refers to any activity associated with extracting hydrocarbons from subsurface location, such as a well or other opening. Hydrocarbon production normally refers to any activity conducted to form the wellbore along with any activity in or on the well after the well is completed. Accordingly, hydrocarbon production or extraction includes not only primary hydrocarbon extraction, but also secondary and tertiary production techniques, such as injection of gas or liquid for increasing drive pressure, mobilizing the hydrocarbon or treating by, for example, chemicals, hydraulic fracturing the wellbore to promote increased flow, well servicing, well logging, and other well and wellbore treatments.

As used herein, a "mode" refers to a functional state associated with a particular setting, a particular configuration, or a plurality of settings and/or configurations. For example, a mode may involve using a low-frequency effective clock speed to decode incoming signals. As another example, a mode may involve using a high-frequency effective clock speed to decode incoming signals. As yet another example, a mode may involve listening for a signal and may additionally involve using a particular form of detection, such as windowing, sliding window, data smoothing, statistical averaging, trend detection, polyhistogram and the like.

As used herein, "monitored section" and "monitored sections" refer to locations along the tubular members that include sensors and/or are regions of interest.

As used herein, "unmonitored section" and "unmonitored sections" refer to locations along the tubular members that do not include sensors and/or are not regions of interest.

As used herein, "operatively connected" and/or "operatively coupled" means directly or indirectly connected for transmitting or conducting information, force, energy, or matter.

As used herein, "optimal", "optimizing", "optimize", "optimality", "optimization" (as well as derivatives and other forms of those terms and linguistically related words and phrases), as used herein, are not intended to be limiting in the sense of requiring the present invention to find the best solution or to make the best decision. Although a mathematically optimal solution may in fact arrive at the best of all mathematically available possibilities, real-world embodiments of optimization routines, methods, models, and processes may work towards such a goal without ever actually achieving perfection. Accordingly, one of ordinary skill in the art having benefit of the present disclosure will appreciate that these terms, in the context of the scope of the present invention, are more general. The terms may describe one or more of: 1) working towards a solution which may be the best available solution, a preferred solution, or a solution that offers a specific benefit within a range of constraints; 2) continually improving; 3) refining; 4) searching for a high point or a maximum for an objective; 5) processing to reduce a penalty function; and/or 6) seeking to maximize one or more factors in light of competing and/or cooperative interests in maximizing, minimizing, or otherwise controlling one or more other factors, etc.

As used herein, "potting" refers to the encapsulation of electrical components with epoxy, elastomeric, silicone, or asphaltic or similar compounds for the purpose of excluding moisture or vapors. Potted components may or may not be hermetically sealed.

As used herein, "range" or "ranges", such as concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a range of about 1 to about 200 should be interpreted to include not only the explicitly recited limits of 1 and about 200, but also to include individual sizes such as 2, 3, 4, etc. and sub-ranges such as 10 to 50, 20 to 100, etc. Similarly, it should be understood that when numerical ranges are provided, such ranges are to be construed as providing literal support for claim limitations that only recite the lower value of the range as well as claims limitation that only recite the upper value of the range. For example, a disclosed numerical range of 10 to 100 provides literal support for a claim reciting "greater than 10" (with no upper bounds) and a claim reciting "less than 100" (with no lower bounds).

As used herein, "sealing material" refers to any material that can seal a cover of a housing to a body of a housing sufficient to withstand one or more downhole conditions including but not limited to, for example, temperature, humidity, soil composition, corrosive elements, pH, and pressure.

As used herein, "sensor" includes any electrical sensing device or gauge. The sensor may be capable of monitoring or detecting pressure, temperature, fluid flow, vibration, resistivity, or other formation data. Alternatively, the sensor may be a position sensor.

As used herein, "stream" refers to fluid (e.g., solids, liquid and/or gas) being conducted through various regions, such as equipment and/or a formation. The equipment may include conduits, vessels, manifolds, units or other suitable devices.

As used herein, "subsurface" refers to geologic strata occurring below the earth's surface.

As used herein, "tubular member", "tubular section" or "tubular body" refer to any pipe, such as a joint of casing, a portion of a liner, a drill string, a production tubing, an injection tubing, a pup joint, a buried pipeline, underwater piping, or above-ground piping. Solid lines therein, and any suitable number of such structures and/or features may be omitted from a given embodiment without departing from the scope of the present disclosure.

As used herein, "wellbore" or "downhole" refers to a hole in the subsurface made by drilling or insertion of a conduit into the subsurface. A wellbore may have a substantially circular cross section, or other cross-sectional shape. As used herein, the term "well," when referring to an opening in the formation, may be used interchangeably with the term "wellbore."

As used herein, "well data" may include seismic data, electromagnetic data, resistivity data, gravity data, well log data, core sample data, and combinations thereof. Further, the well data may also include temperature, pressures, strain and other similar properties. The well data may be obtained from memory or from the equipment in the wellbore. The well data may also include the data associated with the equipment installed within the wellbore and the configuration of the wellbore equipment. For example, the well data may include the composition of the tubular members, thickness of the tubular members, length of the tubular members, fluid composition within the wellbore, formation properties, cementation within the wellbore and/or other suitable properties associated with the wellbore.

As used herein, "zone", "region", "container", or "compartment" is a defined space, area, or volume contained in the framework or model, which may be bounded by one or more objects or a polygon encompassing an area or volume of interest. The volume may include similar properties.

The exchange of information may be used to manage the operations for different technologies. By way of example, the communication network may include communication nodes disposed along one or more tubular members. The communication nodes may be distributed along casing or tubing within a wellbore, along a subsea conduit and/or along a pipeline, to enhance associated operations. To exchange information, the communication network may include physically connected communication nodes, wirelessly connected communication nodes or a combination of physically connected communication nodes and wirelessly connected communication nodes.

By way of example, the communication network may be used for data exchanges of operational data, which may be used for real-time or concurrent operations involving hydrocarbon exploration operations, hydrocarbon development operations, and/or hydrocarbon production operations. In hydrocarbon operations, the system or method may involve communicating via a downhole network including various communication nodes spaced-apart along a length of tubular members, which may be a tone transmission medium (e.g., conduits). The communication nodes may communicate with each other to manage the exchange of data within the wellbore and with a computer system that is utilized to manage the hydrocarbon operations. By way of example, the communication network may involve transmitting and/or receiving signals or tones via one or more frequencies of acoustic tones in the form of data packets via the tone transmission medium. The downhole wireless communication through the tubular members, such as casing and/or production tubing, may be beneficial for enhancing hydrocarbon operations, such as optimizing drilling, optimizing and managing completions, and performing well management. In such communications, the communication network may include communication nodes that utilize ultrasonic acoustic frequencies to exchange information.

The communication nodes may include a housing that isolates various components from the wellbore environment. For example, the communication nodes may include one or more encoding components, which may be configured to generate and/or to induce one or more acoustic tones via tone transmission medium, such as a tubular member or liquid inside the tubular member. Alternately, conduit refers to an acoustic channel of liquid which may, for example, exist between the formation and a tubular member. In addition, the communication nodes may include one or more decoding components, which may be configured to receive and/or decode acoustic tones from the tone transmission medium. The decoding components may include filters to modify the received signals, which may include a high pass filter, for example. The communication nodes may include one or more power supplies configured to supply power to the other components, such as batteries. The communication nodes may include one or more sensors, which may be configured to obtain measurement data associated with the downhole environment and/or the formation. The communication nodes may include relatively small transducers to lessen the size and energy demand of the communication nodes, such that each of the communication nodes may be disposed or secured to locations having limited clearance, such as between successive layers of downhole tubular members. The smaller transducers have higher acoustic resonant frequencies compared to larger transducers and thus use less energy to send acoustic signals around the resonant frequency band as compared with the larger transducers around their respective resonant frequency bands. By way of example, the transducer may transmit out high frequency signals consuming less power due to the small size transducer's intrinsic resonant frequency being high, while the transducer may receive the same high frequency acoustic signals. The aliasing occurs at the microcontroller level, such that the receiving transducer may be the same size as the transmitting transducer, if it is not the same transducer. A benefit from using a small transmitting transducer and receiving transducer, is that small factor transducers enable a compact communication node.

To manage the transmission and reception of signals, the communication nodes may include a processor that operates at one or more effective clock speeds. The communication nodes may operate at a high-frequency effective clock speed and/or a low-frequency effective clock speed. The effective clock speed is the clock speed at which the processor operates after inclusion of applicable clock multipliers or clock dividers. As a result, the sampling frequency is equal to the effective clock speed, while the telemetry frequency is the frequency of a given telemetry tone.

For example, a sampling frequency greater than or equal to ($\geq$) two times telemetry frequency may indicate a high-frequency clock, while a sampling frequency less than (<) two times telemetry frequency may indicate a low-frequency clock. The sample frequency may be at least double the telemetry frequency, which may be two and a half or three or more. Accordingly, the processor may be configured to operate at a frequency less than (<) two times telemetry frequency (e.g., operate as a low-frequency clock) and/or may be configured operate at a frequency of at least double the telemetry frequency (e.g., operate as a high-frequency clock). By way of example, the low-frequency effective clock speed may be less than or equal to 200 kHz, less than or equal to 150 kHz, less than or equal to 75 kHz or less than or equal to 50 kHz, while the high-frequency effective clock speed may be may be greater than 200 kHz, greater than or equal to 500 kHz, greater than or equal to 1 MHz, greater than or equal to 10 MHz or greater than or equal to 100 MHz. As a specific example, the communication node may include an ultrasonic receiver, such as a suitable transducer, to provide a signal or tones to a digital processor, such as a microcontroller. The microcontroller may detect the analog ultrasonic signals from the ultrasonic receiver at a sample rate at least two and a half (2.5) times the highest ultrasonic frequency of interest. Accordingly, the digital processor may have an effective clock speed of at least 500 kHz and/or at least 100 MHz.

As the digital processors consume energy at a rate proportional to processor's clock speed, the higher clock speeds hinder or limit the configuration of the communication network and even the communication nodes. For example, the higher clock speed results in higher energy consumption. As a result, the communication nodes may have to enclose more batteries, which increases the size of the structure configuration of communication node, which may limit access to areas of limited clearance. Further, the communication nodes operating at higher clock speeds (e.g., higher power consumption) may lessen the operational life as compared to the communication nodes operating at lower clock speeds. The higher power consumption may limit the overall utility of the communication nodes in the communication network.

To conserve power, the communication nodes may be configured to operate in various modes, such as a sleep mode and an operational mode. For example, the communication node may include a sleep mode that is a low power, non-responsive energy saving state. The sleep mode may be a low energy mode, which limits the availability of the communication node to receive transmitted signals. The operational mode may be a mode of operation that involves the running the processor in one of more of an active mode or a listening mode. The listening mode may involve monitoring for received signals, while the active mode may involve transmitting, obtaining measurement data, and/or storing measurement data form sensors. Accordingly, each of the communication nodes has to balance the sleep mode (e.g., low energy mode) and the operational mode with providing satisfactory levels of communication operations. By way of example, the communication node may enter the sleep mode for an extended period of time, then wakes (e.g., enters the operation mode) to obtain sensor readings and listens for incoming communication. If a signals or tones are detected, the communication node may remain in operational mode for an extended period of time to wait for the communications. If signals or tones are not detected, the communication node may return to the sleep mode. Unfortunately, this approach consumes excess energy because the communication node is awake in operational mode for an extended period of time to receive a communication and because other communication nodes may have to re-transmit packets when the communication node is in the sleep mode and does not detect the transmitted signals. For example, the handshaking may involve transmitting extra tones between the different communication nodes, which drains the battery more rapidly. As an alternative example, the communication nodes may rely upon synchronization of the respective internal clocks, such that the communication nodes are in operational mode at the same time. Unfortunately, the timing of clocks tend to drift, which may be due to temperature and manufacturing tolerances, and/or occasional handshaking to maintain the synchronization of the clocks are problematic for this type of configuration. Accordingly, aliasing may be used to enable low-frequency effective clock speeds to be used in the communication nodes to receive signals and the high-frequency effective clock speeds may be used in the communication nodes to transmit signals, which is a configuration that saves energy. Thus, the communication node may be configured to be more energy efficient for transmitting signals by using a high-speed effective clock speed and receiving signals by using a low-speed effective clock speed.

To enhance the operations, the present techniques may utilize aliasing to provide energy efficiencies in the communication nodes. Contrary to the conventional approaches that involves eliminating or minimizing aliasing in the communication operations, the present techniques use aliasing (e.g., ultrasonic aliasing) to reduce energy consumption (e.g., due to lower frequency clock and lower data sampling rates). The present techniques may provide the energy efficiencies through the management of the clock speed for the communication nodes to manage the transmission and reception of data packets. By way of example, a low-frequency effective clock speed may be used to monitor for incoming data packets. The low-frequency effective clock speed may utilize frequency aliasing to lessen energy usage within the communication node for monitoring for data packets. Further, the configuration may lessen the risk of encountering an unworkable acoustic channel (e.g., frequency band) once operating in a downhole environment, as the multiple frequencies may be utilized to represent a similar aliased frequency in a receiver or decoding module. The present techniques may also provide ancillary benefits in network flexibility and range.

In frequency signaling technologies, the Nyquist theorem or sampling theorem is a principal related to discrete sampling, such as digitization of analog signals into digital signals for a digital processor. Based on this theorem, the sampling rate should be at least two times the highest or maximum frequency. As a result, the discrete sampling may uniquely identify a signal frequency up to the limit of twice of the Nyquist frequency, which is a function of the sampling frequency, as shown in logic statement (s1):

let: $f_s$=sampling frequency, and $f_n$=Nyquist frequency;

then: $f_n = f_s/2$         (s1)

where $f_s$ is the sampling frequency and $f_n$ is the Nyquist frequency.

If the signal frequency exceeds the Nyquist frequency $f_n$, then distortion or aliasing of the signal occurs. For example, the aliased frequency detected at a decoding module in a communication node may have a lower frequency than the transmitted signal frequency. By way of example, if a processor operates at a 32 kHz clock speed, then a signal of 55 kHz may be transmitted on a pipe and it may be received by the communication node as an aliased frequency of about 10 kHz. As the sampling of a signal within the wellbore may be managed by the processing device in the communication node, the effective clock speed may be adjusted to provide the preferred aliasing, which is configured to manage the communication between communication nodes. Thus, if the sampling rate of the signals is less than two times the maximum signal frequency, certain frequency signals in the analog signal may be distorted or aliased. The detection of these signals may be configured to represent the exchange of information based on the present techniques to be properly determined in the digitized outputs. Accordingly, the differentiation in certain frequency components may not be properly represented from the original analog signal, but may be used in accordance with the present techniques.

In certain embodiment, the processor's effective clock speed may be adjustable to certain frequencies or may be set at fixed frequencies. Preferably, the processor operating at the low-frequency effective clock speed may be as slow as possible to conserve more energy, with the limiting factor being the amount of bandwidth required for telemetry. For example, if the required bandwidth for telemetry is 16 kHz, it follows that a processor operating at a 32 kHz effective clock speed may be the slowest clock speed capable of providing this bandwidth via aliasing because 32 kHz sampling rate is capable of distinguishing signals up to 16 kHz without ambiguity. In certain configurations, the processor may be configured to operate at effective clock speeds of 48 MHz or 32.768 kHz.

As an example, if the analog signal is a simple sinusoid, each signal frequency above the Nyquist frequency may be mapped to a specific aliased frequency, as shown by the following logic statement (s2):

let: f=signal frequency $f_s$=sampling frequency $f_n$=Nyquist frequency $f_a$=aliased frequency then: $f_a = |f - (k+1)f_s|$ where: $f_a \leq f_n$ $f_n = f_s/2$ k=one of 0, 1, 2, 3,         (s2)

where f is the signal frequency, $f_a$ is the aliased frequency, and k is the band.

As an example, if the sampling frequency $f_s$ is 32.768 kHz, then the Nyquist frequency $f_n$ is 16.384 kHz. Accordingly, a signal frequency of 80 kHz corresponds to an aliased frequency $f_a$ of 14.464 kHz for a band k equal to 1. Also, for the same sampling frequency $f_s$ and Nyquist frequency $f_n$, a signal frequency of 112.768 kHz also corresponds to an aliased frequency $f_a$ of 14.464 kHz for a band k equal to 2.

The present techniques utilize the periodic relationship between aliased frequencies and signal frequencies to decode signal information. By limiting the communication frequency band to have the aliasing resulting in a one-to-one relationship between an ultrasonic frequency and an aliased frequency, each aliased frequency determines exactly one ultrasonic frequency. For example, for a first band, the communication node may be configured to decode signal information using a processor operating at a low-frequency effective clock speed, which uses less power as compared to a processor operating at a high-frequency effective clock speed. In particular, a processor may operate at an effective clock speed of 32.768 kHz, which may correspond to a receiver that draws a current of 1 milliamps (mA), while a processor may operate at an effective clock speed of 48 MHz, which may correspond to a receiver that draws current of 15 mA. As such, the processor operating at the low-frequency effective clock speed may significantly lessen the energy used as compared to the processor operating at the high-frequency effective clock speed.

In certain configurations, the present techniques involves various relationships to manage the frequency aliasing within communication network. By way of example, the ratio of the low-frequency effective clock speed to the high-frequency effective clock speed may be greater than 1:2; may be greater than 1:4; may be greater than 1:10; in a range between 1:2 and 1:1,000; in a range between 1:4 and 1:100 and/or in a range between 1:10 and 1:80. In other configurations, the Nyquist frequency is associated with the receiving communication node and is based on the effective clock speed in force at the receiving communication node. For example, the transmitted signal frequency may be greater than the Nyquist frequency; may be greater than two times the Nyquist frequency; may be greater than three times the Nyquist frequency; or the transmitted signal frequency may be greater than four times the Nyquist frequency. The ratio of the Nyquist frequency to the transmitted signal frequency may be in the range between 1:2 and 1:1,000; may be in a range between 1:2 and 1:100 and/or may be in a range between 1:2 and 1:10. As another example, the transmitted signal, which may be at a frequency higher than the sampling frequency, may be decoded to provide the information for decoding the remainder of the packet.

In one configuration, the communication nodes may be configured to transmit at a high-frequency effective clock speed and may be configured to receive at a low-frequency effective clock speed. In such a configuration, the communication nodes may utilize higher energy in transmitting the data packets and may utilize lower energy in receiving the data packets (e.g., operational data). By way of example, the communication nodes may include one or more processors operating at an effective clock speed of about 48 MHz for transmission of data packets on the communication network and one or more processors operating at an effective clock speed of about 32.768 kHz for reception of data packets. The low-frequency effective clock speeds may include 32 kHz, 32.768 kHz, 38 kHz, 77.500 kHz, 100 kHz, 120 kHz, and 131.072 kHz; and the high-frequency effective clock speeds may include 500 kHz, 1 MHz, 2 MHz, 8 MHz, 32 MHz, 48 MHz and 80 MHz.

In addition, other configurations may include processors that include different types of transducers, for example, piezoelectric components or magnetostrictive components, to generate the signals and/or to receive the signals. By way of example, the communication nodes may include piezoelectric transducers of different sizes. The encoding components may include smaller piezoelectric transducers that may be configured to transmit higher frequency signals (e.g., around their resonant frequency bands), which use less electrical power as compared to larger piezoelectric transducer or to transmit signals outside the resonant frequency bands of a given transducer. In addition, the smaller piezoelectric transducers may provide a mechanism to lessen the size of the structure for the communication nodes. Accordingly, the encoding component may be configured to transmit at higher frequencies, which utilizes less energy than the low-frequency transmissions. Thus, by using the high-frequencies for the transmissions in combination with the low-frequency effective clock speeds on the decoding component (e.g., receiver), the communication nodes may lessen energy usage.

In other configurations, the aliased signals (e.g., aliased frequencies) may be used to enhance redundancy. In particular, the transmitted signals may be generated by at two or more frequencies, which correspond to the same aliased frequencies at the receiving end (e.g., receiving communication node). For example, if frequencies in a first band are unworkable in the downhole environment, the communication nodes may alternately transmit signals on a second band because both bands alias to the same aliased frequencies (e.g., the mapping is to a similar detectable frequency once normalized to a low-frequency effective clock speed). Accordingly, several alternate bands may be available based on the differences of the effective clock speeds. As a result, several aliased frequencies may be used to mitigate the risk of losing communication due to an unworkable band (e.g., downhole environment or wellbore conditions, such as caused by frequency selective fading).

Certain configurations may utilize the aliased frequencies to signal the communication node, which may be to perform a specific operation or to transmit data packets (e.g., operational data). By way of example, communication nodes may be configured to use a combination of one or more aliased frequencies as a signal to place the communication node into an operational mode from a sleep mode in the respective communication node. In particular, a communication node may use a sequence of one or more aliased frequencies as a signal to wake another communication node from sleep mode. In such a configuration, the communication node may be configured to operate in a sleep mode (e.g., a low energy mode) and an operational mode (e.g., a higher energy mode). The sleep mode may be configured to operate with a low-frequency clock, while the operational mode may be configured to operate with a low-frequency clock and/or a high-frequency clock. Upon receiving the signal, the received signal may be reviewed to determine whether it is a wake-up signal. If it is a wake up signal, the communication node may enter operational mode and may use the low-frequency effective clock speed and/or high-frequency effective clock speed to decode the received signals.

In yet another configuration, the communication nodes may be used to communicate with other communication devices, such as low-frequency devices. By way of example, the communication nodes may include low-frequency effective clock speeds that are utilized to communicate with low-frequency devices, such as a hydrophone. The hydrophones may be configured to operate with low-frequency signals and/or high-frequency signals, which may be used to communication with the communication nodes. The low-frequency device may be utilized to exchange data or instructions to the communication nodes. This configuration may be used to reach or communicate with communication nodes that may provide longer range communications than conventionally utilized within the wellbore. As a specific example, the communication nodes may be configured to receive communication signals from a communication device, such as a hydrophone or a designated communication node, transmitting in a lower frequency band (e.g., to provide longer range communications) without involving reconfiguration of any network devices, such as the communication nodes. In particular, the downhole network may be configured to receive and/or to transmit frequencies less than 200 kHz, less than 100 kHz, or preferably less than 50 kHz. The use of the lower frequencies extends the distance that the lower-frequency communication nodes may be spaced apart from each other and maintain the exchange of data packets. As a specific example, certain communication nodes may be configured to receive signals at frequencies less than 15 kHz. These low-frequency communication nodes may be disposed within different zones of the wellbore, which may be utilized within the respective zones to lessen the risk of becoming separated or losing a portion of the downhole network. The communication nodes that operate at these lower frequencies may be configured to receive longer range signals as compared with communication nodes operating at higher frequencies. As a result, the lower-frequency communication nodes may be reachable, while the higher-frequency communication nodes may not be able to communicate in certain zones of the wellbore. Similarly, the communication nodes may be configured to receive communication signals from a communication device, such as a pig within a pipeline or subsea conduit, transmitting in a lower frequency band (e.g., to provide longer range communications) without involving reconfiguration of any network devices, such as the communication nodes. The pig, which may be used to clean the interior of the pipeline, may be moved within the pipeline and configured to communicate with the various communication nodes associated with the pipeline.

In one or more configurations, filters may be used to further manage the exchange of data packets (e.g., operational data) between the communication nodes. The communication nodes may include filters configured remove production noises and/or noises from hydrocarbon operations, where typical low frequency exists (e.g. less than (<) about 10 kHz to about 15 kHz). By way of example, the communication nodes may include a high pass filter configured to pass certain frequencies. Preferably, the filter may be used to remove low-frequency signals. In a preferred configuration, one or more filters may be activated or deactivated in the communication node, which may be communicated adjusted based on signals communicated between the communication nodes. As such, the communication node may be configured to apply a filter to be applied to each received signal when the setting is enabled and to bypass the filter when the setting is disabled. The change in the status of the filtering may be based on a setting in the communication node or based on a notification that is received in a transmitted signal.

In still yet another configuration, the high-frequency effective clock speed of the communication node may be used with the low-frequency effective clock speed in the same communication node, which may be utilized together to verify signals exchanged between the communication nodes. For example, the communication node may receive a signal and decode the signal with the high-frequency effective clock speed and the low-frequency effective clock speed. Then, the communication node may be configured to compare the decoded information with the different effective clock speeds to determine if the signal is accurate and/or decoded information with the different effective clock speeds to obtain the information indicated. Or decode using low frequency effective clock speed first as initial screening to decide to use high frequency effective clock speed or not, if needed, high frequency effective clock speed is used, this way could save energy by avoid using high frequency effective clock speed as much as possible.

In one or more embodiment, the communication network may be a wireless communication network that includes different types of wireless communication types. The wireless communication networks may include high-frequency communication networks, which include high-frequency communication nodes, and/or low-frequency communication networks, which include low-frequency communication nodes. By way of example, the present techniques may include a configuration that utilizes different types of communication nodes (e.g., low-frequency communication nodes and/or high-frequency communication nodes) to form the communication network, which may include different types of networks. These different communication nodes may be distributed along one or more tubular members, which may be within a wellbore, along a pipeline, or along a subsea conduit, to enhance operations. The communication nodes may include using low-frequency communication nodes at locations that do not involve sensing (e.g., in an uncompleted vertical section). The low-frequency communication nodes may involve a low-frequency ranges, which may be utilized for optimal performance with low system complexity. The high-frequency communication nodes may be used for locations that involve sensing (e.g., near completions or zones of interest). The high-frequency communication nodes may involve a higher frequencies as compared to a low-frequencies used by the low-frequency communication nodes.

As a further example, the communication network may include low-frequency communication nodes; high-frequency communication nodes; communication nodes configured to communicate with high-frequencies and low-frequencies signals and communication nodes that are configured to communicate with low and/or high frequency radio frequencies (RF). The low-frequency communication nodes may be configured to transmit signals and to receive signals that are less than or equal to ($\leq$) 200 kHz, $\leq$100 kHz, $\leq$50 kHz, or $\leq$20 kHz. In particular, the low-frequency communication nodes may be configured to exchange signals in the range between 100 Hz and 20 kHz; in the range between 1 kHz and 20 kHz; and in the range between 5 kHz and 20 kHz. Other configurations may include low-frequency communication nodes, which may be configured to exchange signals in the range between 100 Hz and 200 kHz; in the range between 100 Hz and 100 kHz; in the range between 1 kHz and 200 kHz; in the range between 1 kHz and 100 kHz; in the range between 5 kHz and 100 kHz and in the range between 5 kHz and 200 kHz. The communication nodes may also include high-frequency communication nodes configured to transmit and receive signals that are greater than (>) 20 kHz, >50 kHz, >100 kHz or >200 kHz. Also, the high-frequency communication nodes may be configured to exchange signals in the range between greater than 20 kHz and 1 MHz, in the range between greater than 20 kHz and 750 kHz, in the range between greater than 20 kHz and 500 kHz. Other configurations may include high-frequency communication nodes, which may be configured to exchange signals in the range between greater than 100 kHz and 1 MHz; in the range between greater than 200 kHz and 1 MHz; in the range between greater than 100 kHz and 750 kHz; in the range between greater than 200 kHz and 750 kHz; in the range between greater than 100 kHz and 500 kHz; and in the range between greater than 200 kHz and 500 kHz.

In one or more configurations, the communication network may include a physical connection network. The physical connections may include one or more cables, one or more electrical conductors and/or one or more fiber optic cables, which may be secured to a tubular member and used to evaluate subsurface conditions. The physical connection may be secured to an inner portion of the tubular member and/or an outer portion of the tubular member. The physical connection provides a hard wire connection that may provide concurrent or real-time exchange of data packets within the wellbore. In addition, the physical connection may be used to provide power directly to communication nodes and/or downhole sensors.

In other configurations, as physical cables may be difficult to deploy along tubular members in certain environments (e.g., a wellbore), the communication network may include a combination of one or more wireless networks with one or more physical connection networks. In such a configuration, the physical connection network of communication nodes may be disposed at locations that do not involve sensing (e.g., in an uncompleted vertical section), while the wireless network of communication nodes may be disposed at locations in horizontal sections of the wellbore or sections that involve sensing (e.g., monitored sections of the wellbore). Another configuration may include using wireless network of communication nodes for long range communications, while the wired physical connections network of communication nodes may be used for monitored sections of the wellbore to handle the high speed data transmissions within those sections.

In yet another configuration, the aliasing may utilize different decoding modes. The decoding or detecting modes may utilize windowing, a sliding window, data smoothing, statistical averaging, trend detection, polyhistogram and the like. The detecting mode may also be combined with simple redundancy of various forms of spread spectrum communications, such as spectrum-constrained application. Also, the decoding modes may be combined with one or more layers of forward error correction (FEC). By way of example, the decoding modes may include Fast Fourier Transform (FFT) detection and/or zero crossing detection (ZCX), which decode via frequency domain and time domain, respectively. The tones may be defined as decoded or detected if FFT recognizes the correct frequencies or ZCX recognizes the correct periods. The FFT and/or ZCX may be selected depending on computational power and energy efficiency of the microcontroller deployed in the communication node. For FFT, tone selection may be based on the relative magnitude of each tone. FFT may involve greater computational power, but is more able to handle background noise. For ZCX, tone selection may be based on normalized period of zero crossings of each tone. ZCX may involve less computational power, but may be vulnerable to misdetections due to background noise. Also, FFT may resolve amplitude dependent signals, while ZCX involves low power devices and/or low received signal levels.

Beneficially, the present techniques may provide various enhancements. For example, the use of aliasing provides a mechanism to receive ultrasonic signal information without having to use a high-frequency effective clock speed and/or a low-frequency effective clock speed in the communication node. In such a configuration, the availability of the decoding module in the communication nodes may be more available because the low-frequency effective clock speed uses less power than the high-frequency effective clock speeds (e.g., longer operational life). As a result, the decoder component module is available and may be spend more time in operational mode, and less time in sleep mode, while expending the same or less energy relative to the conventional approaches, which may be in the sleep mode the majority of the time. The aliasing and the use of the low-frequency effective clock speed provides significant energy savings as compared to conventional approaches. Also, the use of aliasing provides a mechanism to receive communications in multiple interchangeable bands without receiver reconfiguration. In addition, the frequency bands may be mixed within a single communication. Further, the communication nodes may utilize the aliasing to receive signals of simultaneous frequencies from multiple bands to lessen risk of frequency selective fading.

Accordingly, the present techniques may enhance the hydrocarbon operations through the use specific configuration of communication nodes in a communication network. For example, in one configuration, a method for communicating data among a plurality of communication nodes (e.g., along a wave propagation channel, acoustic channel, a communication medium, and/or along one or more tubular members) is described. The method may include: creating a communication network, wherein the communication network comprises a plurality of communication nodes, wherein each of the plurality of communication nodes are configured to utilize aliased frequencies in one or more signals to communicate between two or more of the plurality of communication nodes; configuring the plurality of communication nodes (e.g., along an wave propagation channel, acoustic channel, a communication medium, and/or along the one or more tubular members); communicating operational data between two or more of the plurality of communication nodes, wherein the communicating the operational data is at least partially based on the aliased signals; and performing operations (e.g., hydrocarbon operations) based on the operational data. The method may also include disposing the plurality of communication nodes along the one or more tubular members.

In one or more configurations, the method may include various enhancements. The method may include wherein each of the plurality of communication nodes comprise a processor that operates at a low-frequency effective clock speed to receive one or more signals and at a high-frequency effective clock speed to transmit one or more signals; wherein a ratio of the low-frequency effective clock speed to the high-frequency effective clock speed is greater than 1:2 or greater than 1:10; wherein a signal transmitted from a first communication node of the two or more of the plurality of communication nodes operates at a frequency that is greater than one times, two times or even four times the Nyquist frequency of an effective clock speed in a second communication node of the two or more of the plurality of communication nodes; wherein a signal transmitted from a first communication node of the two or more of the plurality of communication nodes has a ratio of a Nyquist frequency of an effective clock speed in a second communication node of the two or more of the plurality of communication nodes to a transmitted signal frequency that is in a range between 1:1 and 1:1,000 or even in a range between 1:2 and 1:10; determining a lowest transmitted frequency of interest in the communication network and selecting a sampling frequency lower than the lowest transmitted frequency of interest for use in the communicating operational data between the two or more of the plurality of communication nodes; wherein each of the plurality of communication nodes is configured to receive one or more signals and determine whether the one or more signals indicate that the communication node enter an operational mode; receiving one or more signals in one of the plurality of communication nodes, determining whether to perform a signal confirmation on the one or more signals, performing the signal confirmation on one or more signals based on the determination that the signal confirmation should be performed and then decoding the one or more signals, and decoding the one or more signals without performing the signal confirmation on one or more signals if the determination is to not perform the signal confirmation; wherein performing the signal confirmation includes performing a high-frequency confirmation that decodes at least a portion of the one or more signals by utilizing a high-frequency effective clock speed in the one of the plurality of communication nodes; wherein the communicating operational data between the two or more of the plurality of communication nodes comprises transmitting one or more signals from a first communication node of the plurality of communication nodes using a plurality of frequency bands, wherein the one or more signals comprise a first signal frequency in a first frequency band of the plurality of frequency bands and a second signal frequency from a second frequency band of the plurality of frequency bands, wherein the first frequency band is different from the second frequency band and the first signal frequency and the second signal frequency represent the same signal frequency based on a low-frequency effective clock speed operating in the second communication node of the two or more of the plurality of communication nodes; wherein the communicating operational data between the two or more of the plurality of communication nodes comprises: receiving one or more signals in one of the plurality of communication nodes, and filtering the one or more signals using a high pass filter to lessen background noise from the one or more signals in the one of the plurality of communication nodes; communicating operational data between one of the plurality of communication nodes and a hydrophone disposed within a wellbore; i) monitoring the communication network for an event, ii) modifying the aliased frequencies used in communication network if an event is detected, iii) continuing communicating between the two or more of the plurality of communication nodes if an event is not detected, and iv) repeating steps i) to iii) until the hydrocarbon operations are complete and/or disposing the plurality of communication nodes and the one or more tubular members within a wellbore, along a subsea conduit, or along a pipeline.

In another configuration, the system for communicating along one or more tubular members is described. The system may include comprise: one or more tubular members; a communication network coupled to the one or more tubular members, wherein the communication network comprises a plurality of communication nodes, wherein each of the plurality of communication nodes are configured to: communicate operational data between two or more of the plurality of communication nodes, wherein the communication of the operational data is at least partially based on the use of aliased signals; and perform hydrocarbon operations based on the operational data.

In one or more other configurations, the system may include various enhancements. The system may include wherein each of the plurality of communication nodes comprise a processor configured to operate at a low-frequency effective clock speed to receive one or more signals and to operate at a high-frequency effective clock speed to transmit one or more signals; wherein a ratio of the low-frequency effective clock speed to the high-frequency effective clock speed is greater than 1:2 or is greater than 1:10; wherein each of the plurality of communication nodes is configured to transmit a signal at a frequency and to receive the signal, wherein the frequency of the signal is greater than one times, two times, or four times the Nyquist frequency of an effective clock speed in the communication node that receives the signal; wherein each of the plurality of communication nodes is configured to transmit a signal at a frequency and to receive the signal, wherein the frequency of the signal has a ratio of a Nyquist frequency of an effective clock speed in the communication node that receives the signal to a transmitted signal frequency that is in a range between 1:1 and 1:1,000 or in a range between 1:2 and 1:10; wherein each of the plurality of communication nodes is configured to: receive one or more signals, and determine whether the one or more signals indicate that the communication node enter an operational mode; wherein each of the plurality of communication nodes are further configured to: receive one or more signals, determine whether to perform a signal confirmation on the one or more signals, perform the signal confirmation on the one or more signals based on the determination that the signal confirmation is to be performed and then decode the one or more signals, and decode the one or more signals without performing the signal confirmation on the one or more signals if the determination is to not perform the signal confirmation; wherein each of the plurality of communication nodes are further configured to perform the signal confirmation by decoding at least a portion of the one or more signals by utilizing a high-frequency effective clock speed; wherein each of the plurality of communication nodes are configured to transmit one or more signals in a plurality of frequencies from a plurality of frequency bands, wherein the one or more signals comprise a first signal frequency in a first frequency band of the plurality of frequency bands and a second signal frequency from a second frequency band of the plurality of frequency bands, wherein the first frequency band is different from the second frequency band and the first signal frequency and the second signal frequency are configured to represent the same signal frequency based on a low-frequency effective clock speed that one or more of the plurality of communication nodes are configured to receive the one or more signals; wherein each of the plurality of communication nodes are further configured to: receive one or more signals, and filter the one or more signals using a high pass filter to lessen background noise from the one or more signals; a hydrophone configured to be disposed within a wellbore and configured to exchange operational data with at least one of the plurality of communication nodes; wherein each of the plurality of communication nodes are further configured to: i) monitor the communication network for an event, ii) modify the aliased frequencies utilized in the communication network if an event is detected, iii) continue communicating with the two or more of the plurality of communication nodes if an event is not detected, and iv) repeat steps i) to iii) until the hydrocarbon operations are complete; wherein at least one of the plurality of communication nodes include a primary transducer configured to transmit one or more signals and to receive signals; wherein the at least one of the plurality of communication nodes include a secondary transducer configured to receive signals, wherein the secondary transducer is configured to provide low frequency sensitivity as compared to the primary transducer; wherein each of the plurality of communication nodes include a first transducer configured to transmit one or more signals and a second transducer configured to receive signals; wherein the first transducer is smaller than the second transducer; wherein the each of the plurality of communication nodes include a third transducer configured to receive signals, wherein the third transducer is configured to provide low frequency sensitivity as compared to the second transducer and the third transducer is larger than the first transducer and the second transducer; and/or wherein the one or more tubular members are disposed within a wellbore, within a subsea conduit, or within a pipeline.

Beneficially, the present techniques provide various enhancements to the hydrocarbon operations. The present techniques may utilize aliasing in the exchange between the communication nodes to enhance communication: (1) reliable communication using redundant ultrasonic frequency band; (2) compatible with existing sensor/communication devices operate at lower frequency bands; (3) capable of operation under noisy production environment; (4) optimized energy efficiency; and/or (5) miniaturized sensor nodes. Further, the present techniques may enhance the hydrocarbon operations by extending the operational life of the communication nodes and providing redundancy in certain exchanges of data between communication nodes (e.g., operational data). Accordingly, as each communication node spends more time listening for signals (e.g., in a listening mode) than transmitting signals (e.g., in an active mode), the energy savings provided by the listening is a useful advantage. Accordingly, the present techniques may be further understood with reference to FIGS. 1 to 7, which are described further below.

FIG. 1 is a schematic representation of a well 100 configured that utilizes a communication network having the proposed configuration of communication nodes. The well 100 includes a wellbore 102 that extends from surface equipment 120 to a subsurface region 128. Wellbore 102 also may be referred to herein as extending between a surface region 126 and subsurface region 128 and/or as extending within a subterranean formation 124 that extends within the subsurface region. The wellbore 102 may include a plurality of tubular sections, which may be formed of carbon steel, such as a casing or liner. Subterranean formation 124 may include hydrocarbons. The well 100 may be a hydrocarbon well, a production well, and/or an injection well.

Well 100 also includes an acoustic wireless communication network. The acoustic wireless communication network also may be referred to herein as a downhole acoustic wireless network that includes various communication nodes 114 and a topside communication node and/or control unit 132. The communication nodes 114 may be spaced-apart along a tone transmission medium 130 that extends along a length of wellbore 102. In the context of well 100, tone transmission medium 130 may include a downhole tubular 110 that may extend within wellbore 102, a wellbore fluid 104 that may extend within wellbore 102, a portion of subsurface region 128 that is proximal wellbore 102, a portion of subterranean formation 124 that is proximal wellbore 102, and/or a cement 106 that may extend within wellbore 102 and/or that may extend within an annular region between wellbore 102 and downhole tubular 110. Downhole tubular 110 may define a fluid conduit 108.

Communication nodes 114 may include various components to exchange data, which may utilize the aliasing to enhance the operations. For example, the communication nodes may include one or more encoding components 116, which may be configured to generate an acoustic tone, such as acoustic tone 112, and/or to induce the acoustic tone within tone transmission medium 130. Communication nodes 114 also may include one or more decoding components 118, which may be configured to receive acoustic tone 112 from the tone transmission medium. A communication node 114 may function as both an encoding component 116 and a decoding component 118 depending upon whether the given node is transmitting an acoustic tone (e.g., functioning as the encoding component) or receiving the acoustic tone (i.e., functioning as the decoding component). The communication nodes 114 may include both encoding and decoding functionality, or structures, with these structures being selectively utilized depending upon whether or not the given communication node is encoding the acoustic tone or decoding the acoustic tone. In addition, the communication nodes 114 may include sensing components that are utilized to measure and monitor conditions within the wellbore 102.

In wells 100, transmission of acoustic tone 112 may be along a length of wellbore 102. As such, the transmission of the acoustic tone may preferably be linear, at least substantially linear, and/or directed, such as by tone transmission medium 130. The generated tones or signals propagate both up the conduit (e.g., tubular member), down the conduit and into the surrounding layers, such as cement, casing, liquid inside the casing, and the formation, to varying degrees depending on the acoustic impedance of the material. Such a configuration may contrast to more conventional wireless communication methodologies, which generally may transmit a corresponding wireless signal in a plurality of directions, or even in every direction.

The communication node 114, which are discussed in more detail herein, are disclosed in the context of well 100, such as a hydrocarbon well. However, it is within the scope of the present disclosure that these methods may be utilized to communicate via acoustic tones in any suitable communication network, which may include one or more acoustic wireless networks. As examples, the acoustic wireless network may be used in a subsea well and/or in the context of a subsea tubular that extends within a subsea environment. Under these conditions, the tone transmission medium may include, or be, the subsea tubular and/or a subsea fluid that extends within the subsea environment, proximal to the subsea tubular, and/or within the subsea tubular. As another example, the communication network in the context of a surface tubular may extend within the surface region. Under these conditions, the tone transmission medium may include, or be, the surface tubular and/or a fluid that extends within the surface region, proximal to the surface tubular, and/or within the surface tubular.

The plurality of frequencies, which are utilized in the communication nodes 114, may include the first frequency for a first type of communication node type and/or a second frequency for a second type of communication node type. Each of the wireless network types may be utilized in different configurations to provide the communication for the hydrocarbon operations. The respective frequency ranges may be any suitable values. As examples, each frequency in the plurality of frequencies may be at least 10 kilohertz (kHz), at least 25 kHz, at least 50 kHz, at least 60 kHz, at least 70 kHz, at least 80 kHz, at least 90 kHz, at least 100 kHz, at least 200 kHz, at least 250 kHz, at least 400 kHz, at least 500 kHz, and/or at least 600 kHz. Additionally or alternatively, each frequency in the plurality of frequencies may be at most 1,000 kHz (1 megahertz), at most 800 kHz, at most 600 kHz, at most 400 kHz, at most 200 kHz, at most 150 kHz, at most 100 kHz, and/or at most 80 kHz.

In other configurations, other devices (not shown) may be used within the wellbore 102. The other devices may include hydrophones and/or other wired tools, which may be disposed inside the wellbore 102. The hydrophones and/or other wired tools may be utilized to exchange data (e.g., operational data) with communication nodes. The other devices may be configured to receive signals at frequencies less than 15 kHz. These low-frequency devices may be disposed within different zones of the wellbore or along a wireline, which may be utilized within the respective zones to communicate with a downhole network. These devices may also or alternately operate at high frequencies.

Figure 2A:
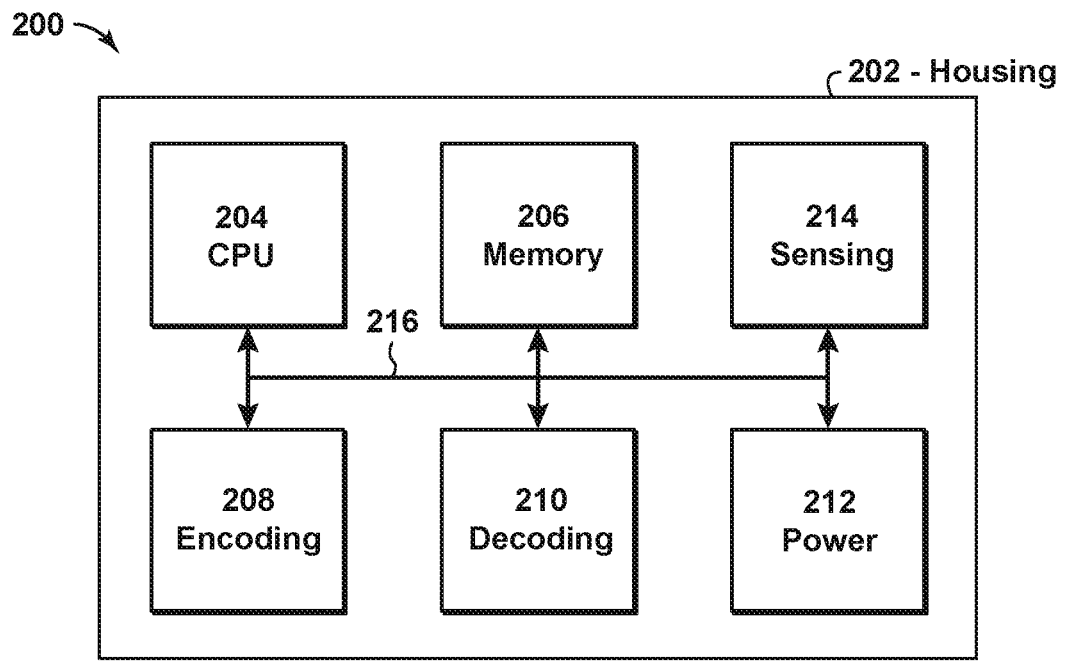
FIGS. 2A and 2B are exemplary views of communication nodes of FIG. 1.
Figure 2B:
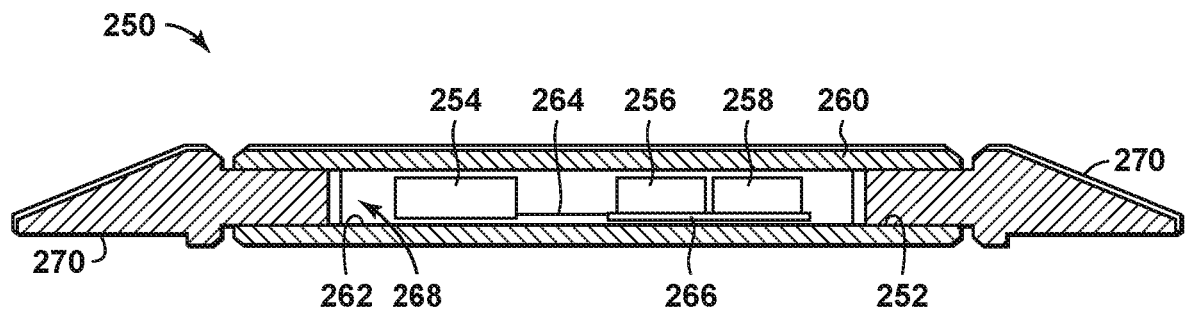

The communication nodes 114 may include various configurations, such as those described in FIGS. 2A and 2B. Each of the communication nodes may be disposed on one of the tubular members, such as a conduit and/or a tubular section within the wellbore. The communication nodes may be associated with equipment, may be associated with tubular members and/or may be associated with the surface equipment. The communication nodes may also be configured to attach at joints, internal or external surfaces of conduits, surfaces within the wellbore, or to equipment.

As a specific example, the communication nodes may be structured and arranged to attach to the surface (e.g., internal or external surface) of conduits at a selected location. This type of communication node may be disposed in a wellbore environment as an intermediate communication node between the surface and any communication nodes associated with the equipment. The communication nodes may be disposed on each tubular member, or may be disposed on alternative tubular members. By way of example, the communication node may be welded onto the respective surface or may be secured with a fastener to the tubular member (e.g., may be selectively attachable to or detachable from tubular member). The fastener may include the use of clamps (not shown), an epoxy or other suitable acoustic couplant may be used for chemical bonding. By attaching to the external surface of the tubular member, the communication nodes may not interfere with the flow of fluids within the internal bore of the tubular section.

FIG. 2A is a diagram 200 of an exemplary communication node. The communication node 200 may include a housing 202 along with a central processing unit (CPU) 204, memory 206, one or more encoding components 208, one or more decoding components 210, a power component 212 and/or one or more sensing components 214, which communicate via a bus 216. The central processing unit (CPU) 204 may be any general-purpose CPU, although other types of architectures of CPU 204 may be used as long as CPU 204 supports the inventive operations as described herein. The CPU 204 may execute the various logical instructions according to disclosed aspects and methodologies. For example, the CPU 204 may execute machine-level instructions for performing processing according to aspects and methodologies disclosed herein. The CPU 204 may contain two or more microprocessors that operate at a high-frequency effective clock speed and/or at low-frequency effective clock speed. The CPU 204 may be a system on chip (SOC), digital signal processor (DSP), application specific integrated circuits (ASIC), and field programmable gate array (FPGA). The memory 206 may include random access memory (RAM), such as SRAM, DRAM, SDRAM, or the like, read-only memory (ROM), such as PROM, EPROM, EEPROM, or the like, and NAND flash and/or NOR flash. The one and/or more sensing components 214 may be configured to obtain sensing data and communicate the sensing data with the other communication nodes. Further, the power component 212 may be disposed in the housing 202 and may be configured to provide power to the other components. The power component 212 may include one or more batteries.

To manage the communications, the communication node 200 may utilize the one or more encoding components 208 and one or more decoding components 210 within the housing 202. The encoding components 208, which may include one or more transducers, may be disposed within the housing 202 and may be configured to generate an acoustic tones and/or to induce the acoustic tone within a tone transmission medium. The one or more decoding components 210, which may include one or more transducers, may be disposed within the housing 202 and may be configured to receive acoustic tones from the tone transmission medium. The encoding component 208 and decoding component 210 may utilize the same transducer in certain configurations.

The encoding components 208 and the decoding components 210 may manage the signals (e.g., the transmission or reception of the signals, respectively) through the operation of a processor operating at specific effective clock speeds, which may utilize the frequency aliasing to enhance the operations. For example, the communication nodes may be configured to transmit at a high-frequency effective clock speed and may be configured to receive at a low-frequency effective clock speed, which may lessen the energy usage to communicate within the wellbore. As such, the ratio of the low-frequency effective clock speed to the high-frequency effective clock speed may be greater than 1:2; may be greater than 1:4; may be greater than 1:10; in a range between 1:2 and 1:1,000; in a range between 1:4 and 1:100 and/or in a range between 1:10 and 1:80. In other configurations, the transmitted signal frequency may be greater than the Nyquist frequency; may be greater than two times the Nyquist frequency; may be greater than three times the Nyquist frequency; or the transmitted signal frequency may be greater than four times the Nyquist frequency. The ratio of the Nyquist frequency to the transmitted signal frequency may be in the range between 1:2 and 1:1,000; may be in a range between 1:2 and 1:100 and/or may be in a range between 1:2 and 1:10. As another example, the use of low frequency aliasing to decode ultrasonic signal information may involve the selection of a sampling frequency lower than the lowest frequency of interest. For example, the sampling frequency may be at least two times the highest frequency of interest to satisfy the Nyquist frequency, may be preferably be a sampling frequency of at least 2.5 or higher, or may be preferably be a sampling frequency of at least 3 or higher.

In yet another exemplary configuration, FIG. 2B is an exemplary cross sectional diagram of a communication node 250 that may be used in the system. The view of the communication node 250 is along the longitudinal axis. The communication node 250 includes a housing 252, which may be fabricated from carbon steel or other suitable material to avoid corrosion at the coupling. The housing 252 is dimensioned to provide sufficient structural strength to protect internal electronics. By way of example, the housing 252 has an outer wall 260, which may be about 0.2 inches (0.51 centimeters (cm)) in thickness. An interior region or cavity 262 houses the electronics, including, by way of example and not of limitation, a power source 254 (e.g., one or more batteries), a power supply wire 264, a first transducer 256, a second transducer 258, and a circuit board 266. The circuit board 266 may preferably include one or more micro-processors and/or one or more electronics modules that processes acoustic signals. Also, the transducers 256 and 258 may be electro-acoustic transducers.

For communication between communication nodes, the first transducer 256 and the second transducer 258 may be configured to convert acoustical energy to electrical energy (or vice-versa) and are acoustically coupled with outer wall 260 on the side attached to the tubular member. As an example, the first transducer 256, which may be configured to receive acoustic signals, and a second transducer 258, which may be configured to transmit acoustic signals, are disposed in the cavity 262 of the housing 252. The first and second transducers 256 and 258 provide a mechanism for acoustic signals to be transmitted and received from node-to-node, along the tubular members (e.g., either up the wellbore or down the wellbore or up a subsea pipe or down a subsea pipe). In certain configurations, the second transducer 258, which may be configured to serve as a transmitter, of intermediate communication nodes may also produce acoustic telemetry signals. Also, an electrical signal is delivered to the second transducer 258 via a driver circuit. By way of example, a signal generated in one of the transducers, such as the second transducer 258, passes through the housing 252 to the tubular member, and propagates along the tubular member to other communication nodes. As a result, the transducers that generates or receives acoustic signals may be a magnetostrictive transducer (e.g., including a coil wrapped around a core) and/or a piezoelectric ceramic transducer. By way of example, the communication nodes may be configured to transmit using a smaller piezoelectric transducer at high-frequencies (in a preferred embodiment, around their resonant frequency bands), which may lessen the energy usage to transmit signals within the wellbore. Regardless of the specific type of transducer, the electrically encoded data are transformed into a sonic wave that is carried through the walls of a tubular member in the wellbore. Accordingly, the transducers may be configured to only receive signals, only transmit signals or to receive signals and to transmit signals.

Further, the internal components of the communication nodes 250 may include a protective layer 268. The protective layer 268 encapsulates the electronics circuit board 266, the cable 264, the power source 254, and transducers 256 and 258. This protective layer 268 may provide additional mechanical durability and moisture isolation. The communications nodes 250 may also be fluid sealed within the housing 252 to protect the internal electronics from exposure to undesirable fluids and/or to maintain dielectric integrity within the voids of a housing. One form of protection for the internal electronics is available using a potting material.

To secure the communication node to the tubular member, the communication nodes 250 may also optionally include a shoe 270. More specifically, the communication nodes 250 may include a pair of shoes 270 disposed at opposing ends of the wall 260. Each of the shoes 270 provides a beveled face that helps prevent the communication node 250 from hanging up on an external tubular body or the surrounding earth formation, as the case may be, during run-in or pull-out. The communication node 250 may also have an optional acoustic coupling material (not shown) between the face that connects the housing to the tubular and the tubular itself.

To enhance the performance, the communication nodes may be configured to utilize the periodic relationship between aliased frequencies and signal frequencies to decode signal information. By limiting the communication frequency band to have the aliasing resulting in a one-to-one relationship between ultrasonic frequency and aliased frequency, each aliased frequency determines exactly one ultrasonic frequency. Accordingly, different effective clock speeds may be utilized to manage the power consumed for transmitting and receiving signals along the communication network. As such, the processor operating at the low-frequency effective clock speed may significantly lessen the energy used as compared to the processor operating at the high-frequency effective clock speed.

Figure 3:
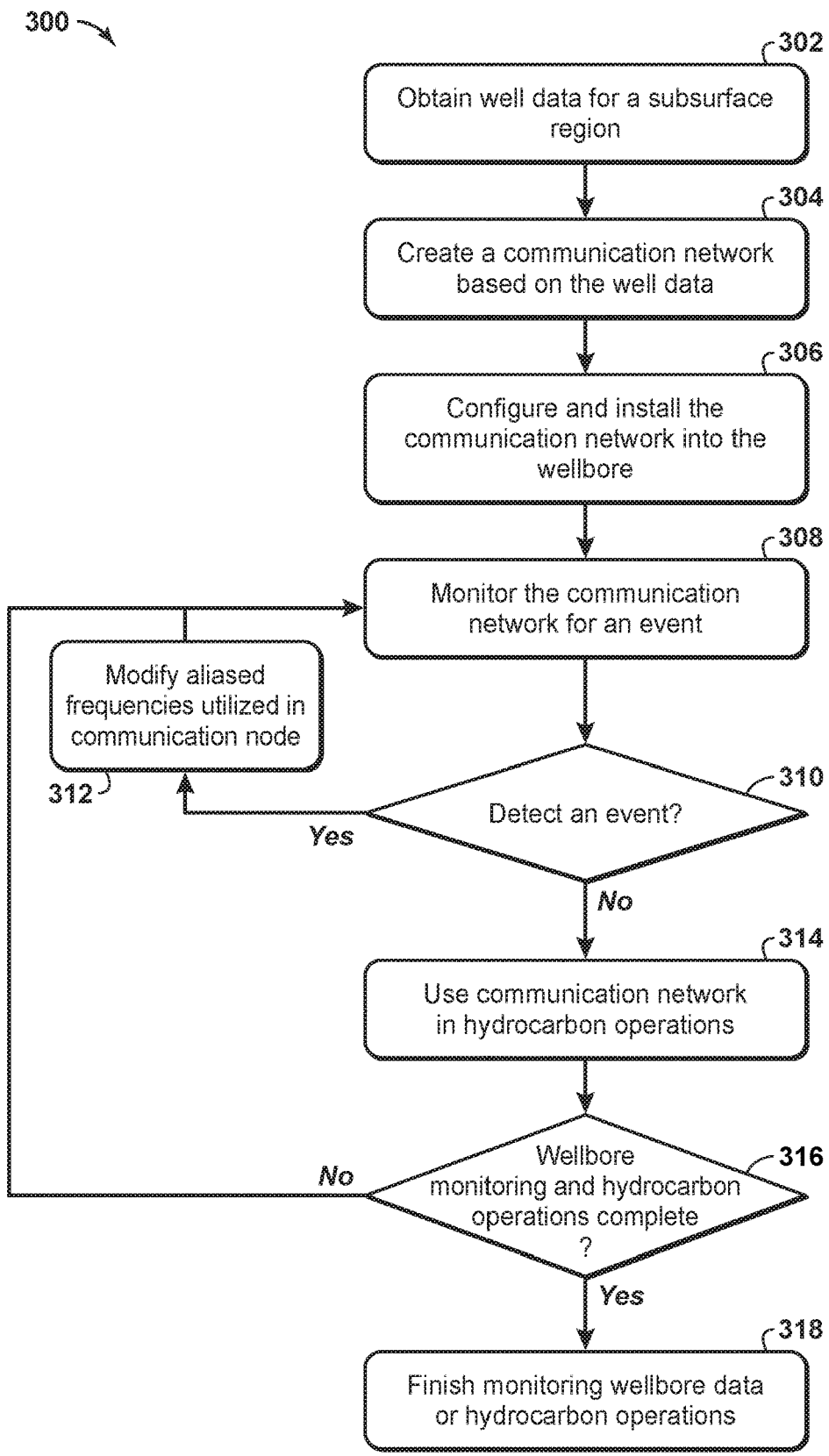
FIG. 3 is an exemplary flow chart in accordance with an embodiment of the present techniques.

FIG. 3 is an exemplary flow chart 300 in accordance with an embodiment of the present techniques. The flow chart 300 is a method for creating, installing and using a communication network for a wellbore. The method may include creating a communication network and installing the communication network in a wellbore, as shown in blocks 302 to 306. Then, the communication network may be monitored and hydrocarbon operations are performed, as shown in blocks 308 to 318.

To begin, the method involves creating, installing and using a wireless communication network for a wellbore, as shown in blocks 302 to 306. At block 302, well data for a subsurface region is obtained. The well data may include seismic data, electromagnetic data, resistivity data, gravity data, well log data, core sample data, and combinations thereof. In other configurations, the well data may include the dimensions and material composition of the tubular members, the material composition of the cement, length of the tubular members, length of the cement and/or other information associated with the equipment and/or configuration of the well. Further, the well data may also include temperature, pressures, strain and other similar properties. The well data may be obtained from memory or from the equipment in the wellbore. At block 304, a communication network is created based on the well data. The creation of the communication network may include selecting acoustic frequency bands; selecting individual frequencies; optimizing the acoustic communication band for each pair of communication nodes; determining coding method for the communication network and/or determining selective modes for the communication network. In addition, the creation of the communication network may include determining the noises and associated filters for the well, determining the effective clock speeds for the communication nodes (e.g., transmission effective clock speeds and reception effective clock speeds), and determining the aliased signals to be used in the communication network. Further, the communication network may be configured to utilize different network types, such as a physical network and/or a wireless network. For example, a communication node may be configured to operate with different wireless network types, such as low frequency, high frequency and/or radio frequency. Each of these different network types may be used to exchange data packets or signals between different communication nodes, which may utilize the aliased frequencies to enhance the hydrocarbon operations. The creation of the communication network may include performing a simulation with a configuration of communication nodes, which may include modeling specific frequencies and/or use of certain type of communication node within specific zones or segments of the wellbore. The simulation may include modeling the tubular members, the communication of signals between communication nodes and/or other aspects, which may indicate the preferred frequency bands and preferred aliased frequencies. The simulation results may include the computation of time-varying fluid pressure and fluid compositions and the prediction of signal travel times within the wellbore. Performing the simulation may also include modeling fluid, modeling signal transmissions and/or structural changes based on the communication network. Then, the communication network is configured and installed into the wellbore, as shown in block 306. The configuration of the communication network may include configuring the communication nodes to utilize specific aliased frequencies to enhance the exchange of data, such as operational data within the wellbore. The installation of the communication network may include disposing the communication nodes within the wellbore, which may be secured to tubular members.

Then, the communication network may be monitored and hydrocarbon operations may be performed, as shown in blocks 308 to 318. At block 308, the communication network is monitored for an event. An event may be a communication failure, such as when the network fails to operate properly, which may be detected by as a local failure; a change in the acoustic environment; a manual trigger and/or a time based period has been reached. The monitoring of the communication network may involve determining if the aliased frequencies are being exchanged between communication nodes within the wellbore, which may include receiving or detecting a string of communications between communication nodes. With redundant communication nodes deployed, if one communication node stops working or the change of acoustic environment prevents successful communication, self-healing mechanism can be utilized to communicate to the next neighbor. At block 310, a determination is made whether an event has been detected. The determination may include determining whether a notification has been indicated or detecting a communication failure. If an event has been detected, the aliased frequencies used in the communication node may be modified, as shown by block 312. The modification of the aliased frequencies may include adjusting the configuration of one or more communication nodes in the communication network to select other acoustic frequency bands, select other individual frequencies; and/or determining the aliased frequencies to be utilized for the communication network and/or for each pair of communication nodes in the communication network.

If an event is not detected, the communication network is used in hydrocarbon operations, as shown in block 314. The communication network may be used in hydrocarbon operations. The hydrocarbon operations may include hydrocarbon exploration operations, hydrocarbon development operations, and/or hydrocarbon production operations. For example, the communication network may be used to estimate well performance prediction and/or to adjust hydrocarbon production operations, such as installing or modifying a well or completion, modifying or adjusting drilling operations and/or installing or modifying a production facility. Further, the results may be utilized to predict hydrocarbon accumulation within the subsurface region; to provide an estimated recovery factor; adjust perforation operations and/or to determine rates of fluid flow for a subsurface region. The production facility may include one or more units to process and manage the flow of production fluids, such as hydrocarbons and/or water, from the formation.

Then, at block 316, a determination is made whether the monitoring and communication with hydrocarbon operations are complete. If the monitoring and communication with hydrocarbon operations are not complete, the communication network is continued to be monitored for an event, as shown in block 308. If the monitoring and communication with hydrocarbon operations are complete, the monitoring wellbore data or hydrocarbon operations may be finished, as shown in block 318. The finishing of the monitoring wellbore data or hydrocarbon operations may involve shutting down network telemetry operations, reconfiguring the network for a different activity, and/or continuing to monitor the subsurface region once the operations are complete.

Beneficially, the method provides an enhancement in the production, development, and/or exploration of hydrocarbons. In particular, the method may be utilized to enhance communication within the wellbore by providing a specific configuration that optimizes communication through the use of frequency aliasing. Specifically, the frequency aliasing may lessen the risk of unreachable communication nodes or a severed or isolated communication network due to emergence of an unworkable downhole communication frequency bands. Further, the enhanced communications may involve less computational effort, may involve less interactive intervention, and/or may be performed in a computationally efficient manner. As a result, the present techniques may lessen costs and/or lessen risks associated with production of hydrocarbons. Moreover, using ultrasonic aliasing provides a mechanism to improve both availability and operational life of a compact ultrasonic wireless communication nodes, and the utility is compounded in a communication network of such communication nodes. Further still, certain configurations may be used to provide a reliable method to wake communication nodes in a sleep mode by transmitting specific frequencies in multiple ultrasonic bands to guard against an inability of some frequencies to reach the downhole communication node.

As may be appreciated, the blocks of FIG. 3 may be omitted, repeated, performed in a different order, or augmented with additional steps not shown. Some steps may be performed sequentially, while others may be executed simultaneously or concurrently in parallel. For example, in certain embodiments, communication nodes may be configured to utilize a common low-frequency effective clock speed (or are using the same frequency low speed clock by default). In other configurations, the communication nodes may be configured to monitor for an event using the low-frequency effective clock speed setting. Other configurations may include the communication nodes being configured to verify or confirm data packets or communication status by using high-frequency effective clock speeds.

Figure 4:
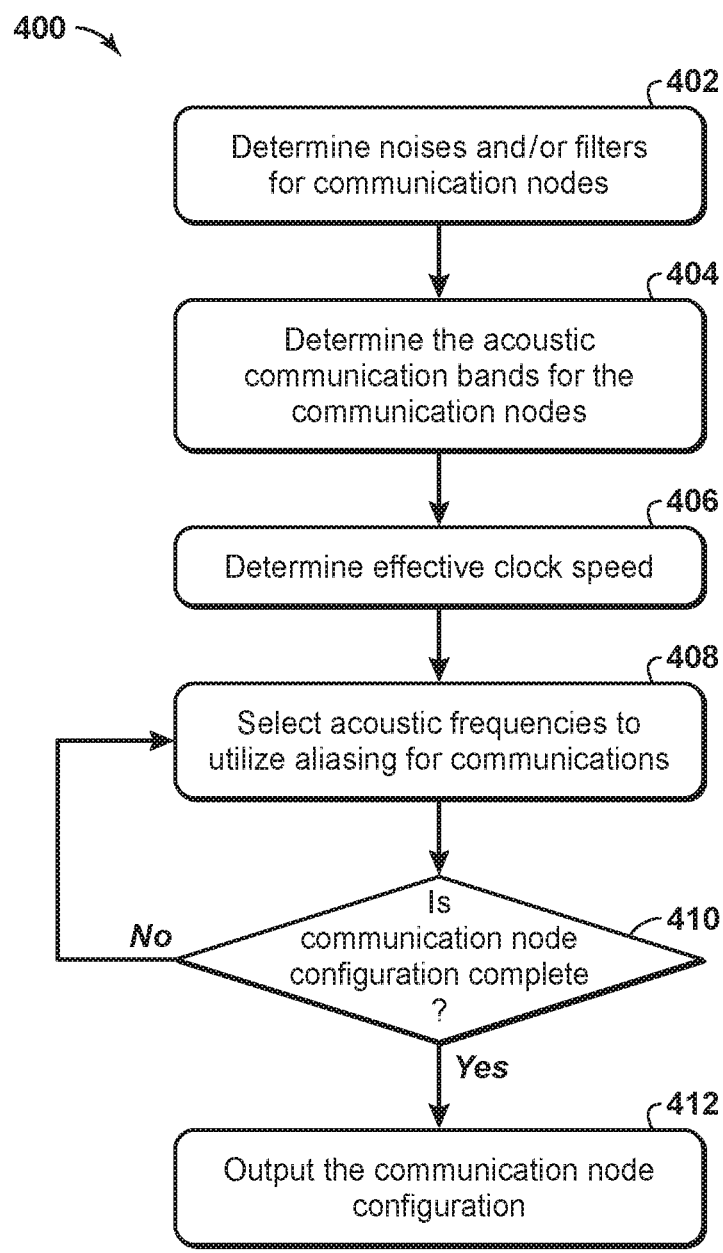
FIG. 4 is an exemplary flow chart for determining aliasing in accordance with an embodiment of the present techniques.

As noted in FIG. 3, the communication network created in block 304, configured and installed in block 306 and modification of the aliased frequencies used in the communication node in block 312 may involve performing various steps. By way of example, FIG. 4 is an exemplary flow chart 400 in accordance with an embodiment of the present techniques. The flow chart 400 may include performing various steps, such as blocks 402 to 408, and then a determination is made whether the communication network configuration is complete and the communication network configuration is outputted, as shown in blocks 410 and 412.

To begin, the method involves performing various steps, as shown in blocks 402 to 408. At block 402, the noises and/or filters for communication nodes are determined. The determination of the noises may involve monitoring the wellbore to determine the background noise frequencies and/or estimating the background noises in the wellbore based on the proposed hydrocarbon operations to be performed or the proposed configuration within the wellbore. Further, the filters may be involve determining the appropriate filter or filters to remove the downhole operation noise and/or other background noise within the wellbore. The one or more filters may include a low pass filter, a high pass filter and/or a band pass filter. Then, at block 404, the acoustic communication bands for the communication nodes are determined. The acoustic communication bands, which may also involve determining individual frequencies may include modeling, simulation and/or experimental testing to identify specific frequency bands (e.g., low attenuation frequencies for long range communication). Then, at block 406, the effective clock speed may be determined for the communication nodes. The determination of the effective clock speed may include evaluation of the required bandwidth and selection of a minimal speed low-frequency clock that provides the desired aliasing characteristics. At block 408, the acoustic frequencies to utilize aliasing for communications are selected. The selection of the acoustic frequencies may include limiting the final band to a subset of the most optimal tones and/or tones from multiple bands to accrue the benefits of redundancy.

At block 410, a determination is made whether the communication node configuration is complete. The determination may include confirmatory lab testing and/or simulation using the chosen configuration. If the communication node configuration is not complete, various steps may be repeated. As shown in this flow chart 400, the determination of noises and/or filters for communication nodes may be repeated, as shown by block 402 and then the other blocks 404 to 410 may be performed. In other configurations, only one or more of the blocks 402 to 408 may be performed if the communication node configuration is not complete. If the communication node configuration is complete, the communication node configuration may be outputted, as shown in block 412. The outputting of the communication node configuration may include storing the communication network configuration and/or displaying the communication network configuration.

Beneficially, the method may include changing the communication node configuration after deployment of nodes in the field to adjust the aliasing behavior, which may be necessitated by changing acoustic conditions, physical defects in the nodes, unexpected communication problems, changes in network routing, adjustments to affect data rate or latency or error rate or operational life.

Figure 5:
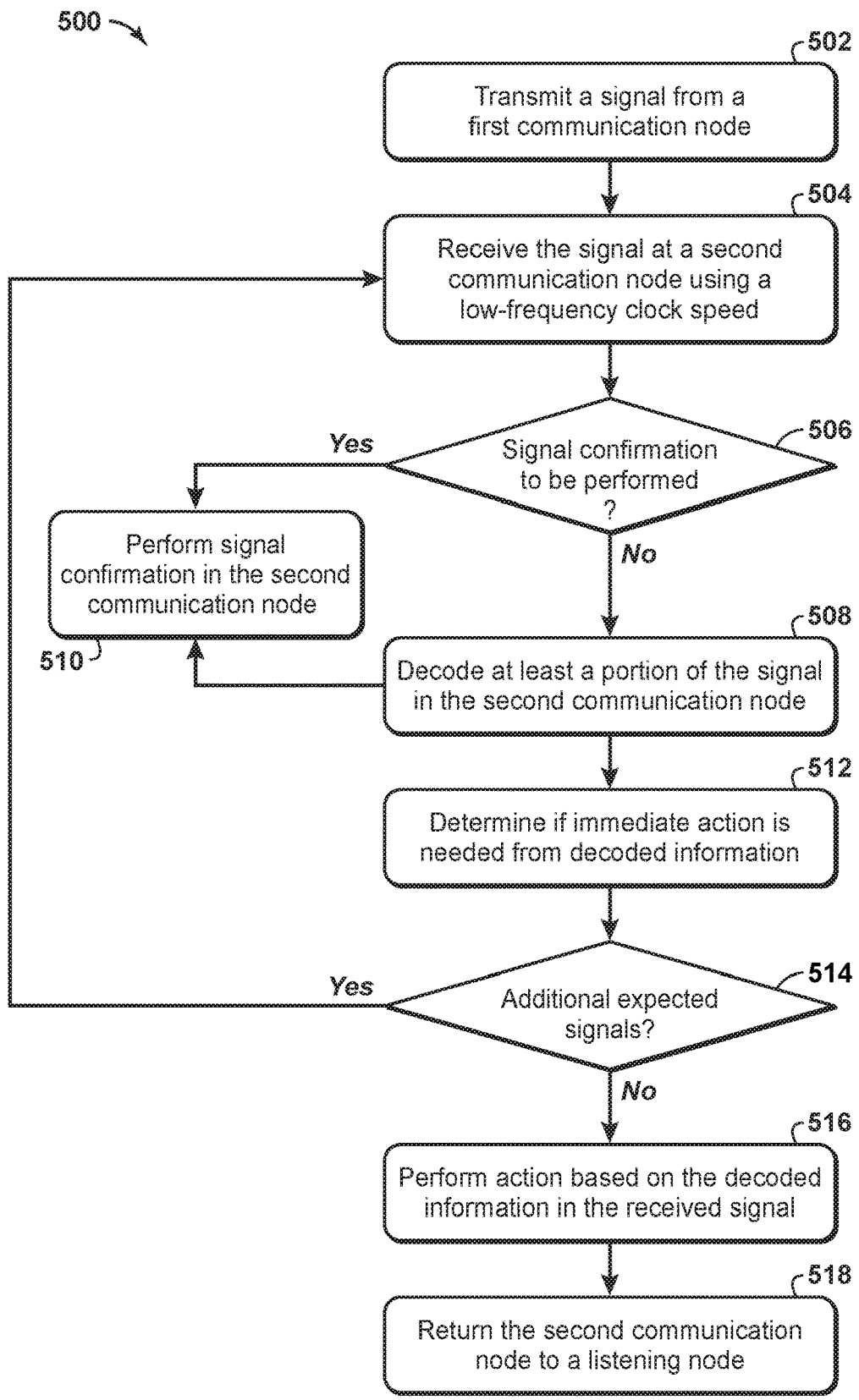
FIG. 5 is an exemplary flow chart for performing communications using aliasing in accordance with an embodiment of the present techniques.

As a further example, the performance of communications using aliased frequencies may be performed in various manners. By way of example, FIG. 5 is an exemplary flow chart 500 for performing communications using aliased frequencies in accordance with an embodiment of the present techniques. The flow chart 500 may include a first communication node and a second communication node. The flow chart 500 may include performing various steps, such as blocks 502 to 514, and then the action is performed based on the decoded information and the communication nodes return to listening mode, as shown in blocks 516 and 518.

To begin, the method involves performing various steps, as shown in blocks 502 to 514. At block 502, a signal is transmitted from a first communication node. The signal may be transmitted by the first communication node using the high-frequency effective clock speed. Then, at block 504, the signal is received at a second communication node using a low-frequency effective clock speed. At block 506, a determination is made whether signal confirmation is to be performed. The determination to perform the signal confirmation may be based on the check sum verification and/or may be a setting on the communication node that is receiving the signal. If the signal confirmation is not to be performed, at least a portion of the signal is decoded in the second communication node, as shown in block 508. The signal decoding may involve using the low-frequency effective clock speed and/or high-frequency effective clock speed to decode at least a portion of the signal to obtain the information received in the signal. If the signal confirmation is to be performed, the signal confirmation is performed in the second communication node, as shown in block 510. The signal confirmation may include performing a high-frequency confirmation that may include decoding at least a portion of the signal through the use of the high-frequency effective clock speed. Once the high-frequency confirmation is performed, the at least a portion of the signal is decoded in block 508. Then, at block 512, any necessary immediate action is performed from the decoded information. The decoded information may include operational data, which may include actions to be performed for operating the communication network, sensors and/or other equipment, may be measured data, and/or may be other data utilized for the performing the operations (e.g., hydrocarbon operations within a wellbore). Then, at block 514, a determination is made whether any additional signals are expected. This determination may be based on the decoded information and/or based on a specific period of time. If additional signals are expected, the second communication node may be received at block 504.

However, if additional signals are not expected, an action may be performed based on the decoded information and the communication nodes return to listening mode, as shown in blocks 516 and 518. At block 516, an action is performed based on the decoded information in the received signal. The action may include further transmitting the decoded information to subsequent communication nodes, obtaining measurement data from a sensor, changing a configuration setting, or similar actions. At block 518, the second communication node may be returned to a listening mode. The second communication node may be in an active mode to receive signals and may be in a listening mode when monitoring for expected signals.

Figure 6:
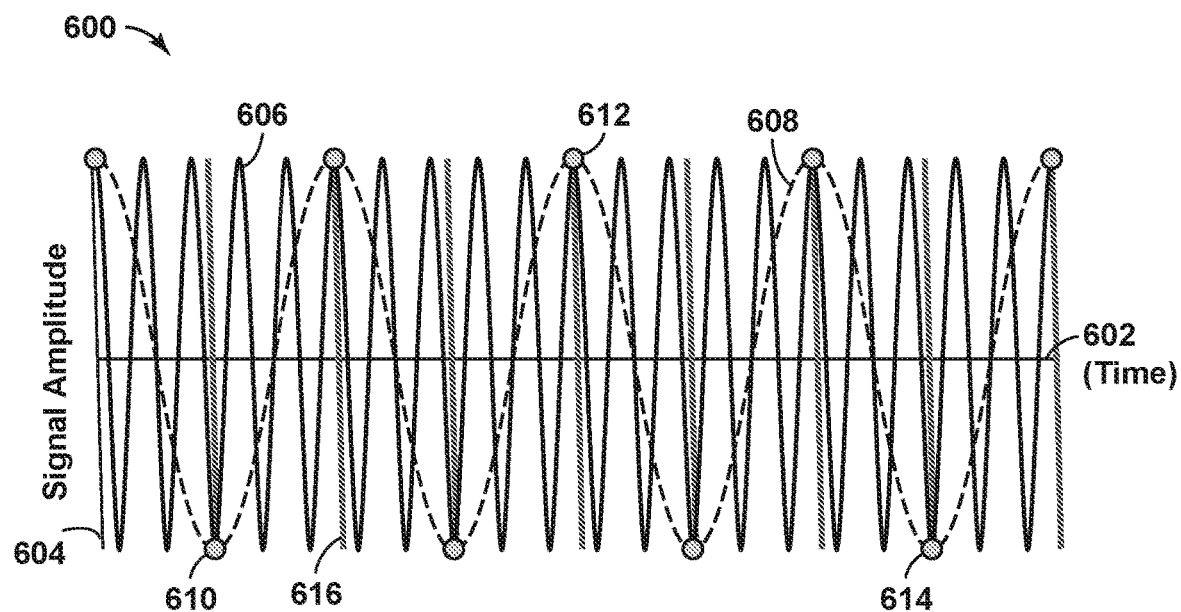
FIG. 6 is exemplary diagram of signal aliasing in a wellbore.
Figure 7:
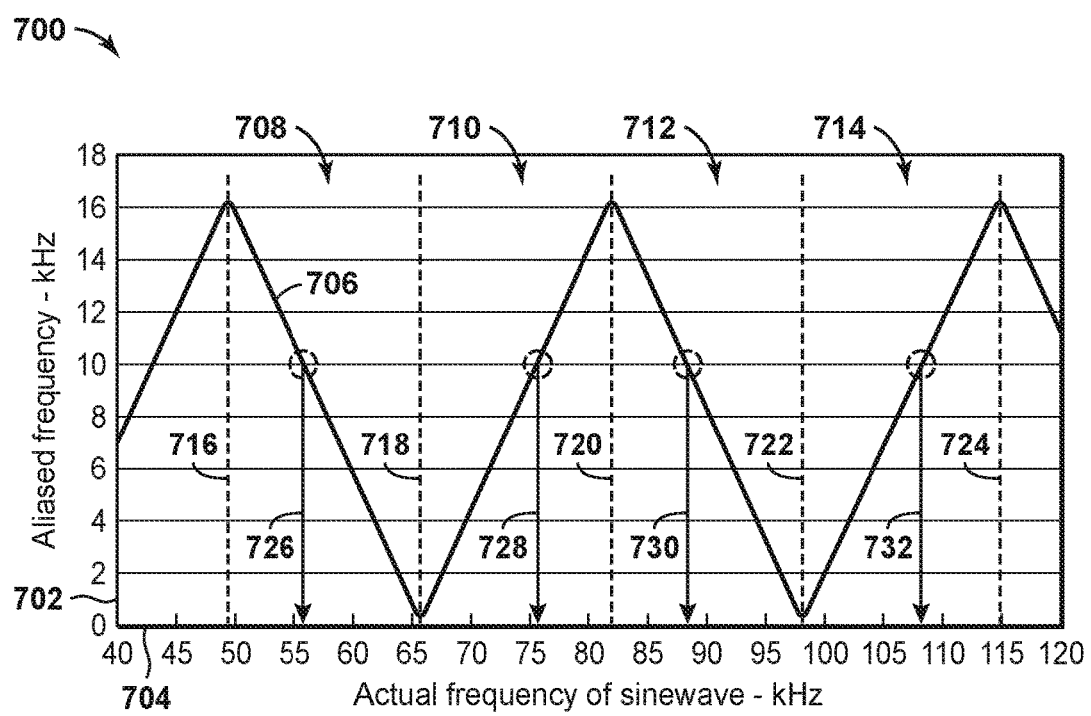
FIG. 7 is an exemplary diagram of the periodic relationship between aliased and signal frequencies that may be used to provide signal information between communication nodes.

By way of example, the aliasing is further described in FIGS. 6 to 7. For example, FIG. 6 is an exemplary diagram 600 of signal aliasing in a wellbore. This diagram 600 includes a first frequency signal 606 and a second frequency signal 608 shown along an amplitude axis 604 and a time axis 602. As shown in diagram 600, the periodic relationship between the first frequency signal 606 and the second frequency signal 608 is shown for various cycles. In this diagram 600, the first frequency signal 606 is the transmitted signal, while the second frequency signal 608 is the sampling signal. The points 610, 612 and 614 from the first frequency signal 606 are represented in the second frequency signal 608. The sampling rate are shown by the vertical lines, which as line 616. The higher frequency components from the first frequency signal 606 are missing and only low frequency signals are detected from aliased signal, which is the second frequency signal 608. Thus, the data available is obtained or collected at the lines associated with the sampling rate. Accordingly, the interpretation of that signals result to a measured frequency lower than reality.

FIG. 7 is an exemplary diagram 700 of the periodic relationship between aliased and signal frequencies that may be used to provide signal information between communication nodes. This diagram 700 includes a response 706 shown along an actual sinusoidal signal axis 704 in kHz and an aliased frequency of axis 702 in kHz. As shown in diagram 700, various bands, such as bands 708, 710, 712 and 714, are formed along the actual frequency of sine wave axis 704 for repeated values on the aliased signal axis 702. The bands are divided by certain frequencies that form the boundaries, such as boundaries 716, 718, 720, 722 and 724.

By limiting the communication frequency bands, such as bands 708, 710, 712 and 714, to have the aliasing resulting in a one-to-one relationship between ultrasonic and aliased frequency, each aliased frequency determines exactly one ultrasonic frequency. For example, as shown in diagram 700, a frequency 728 shown in band 710 may be used for communications. However, the frequencies 726 in band 708, the frequency 730 in band 712 and the frequency 732 in band 714 may correspond to the same value on the aliased signal axis 702. As a result, if band 710 is not operating properly or is unworkable in the downhole environment, communication nodes may alternately transmit in band 714 because both bands alias to the same aliased frequencies. Accordingly, several alternate bands may be available (including the aliased frequencies themselves), which may mitigate the risk of losing communication due to an unworkable band.

Further, a communication node may use a sequence of one or more aliased frequencies, such as frequencies 726, 728, 730 and 732 to indicate a wake from a sleep mode. In such a configuration, each aliased frequency at the receiver may be transmitted using one, two, or more of the actual frequencies (e.g., which correspond to the same aliased frequency) may be transmitted to eliminate or minimize all single points of failure (such as caused by frequency selective fading), due to all these actual frequencies may be aliased to one single low frequency and may be detected at the receiver.

In addition, the use of the different bands may also be used to save energy in the exchange of data packets between communication nodes, which may include operational data. The use of a band that retains a one to one (e.g., 1:1) mapping between ultrasonic tones and aliased tones provides a mechanism for a communication nodes to utilize a low-frequency effective clock speed to detect or receive signals, as well as to receive the entire telemetry data packet. Because communication nodes' operation life is spent alternating between sleeping mode and operational mode (e.g., listening mode or active mode), an energy savings may be obtained by operating in the listening mode, which may be as greater than ten times or greater than one hundred times as compared to performing the communication nodes at a high-frequency effective clock speed. The communication node could "spend" the savings by sleeping less (more responsive to incoming communication fewer wasted transmissions for sending nodes) and/or longer operational life (days or months become years or decades).

For example, certain configurations may receive signals and decode signal information using a low-frequency effective clock speed, which may provide the same value as a high-frequency effective clock speed. As a specific example, a processor operating at a 32.768 kHz effective clock speed may draw electric current of 1 mA, while a processor operating at a 48 MHz effective clock speed corresponds to current draw of 15 mA. Using the 32.768 kHz effective clock speed or sampling rate, any one of the frequency bands, such as bands 708, 710, 712 and 714, may be used alone, as the frequency bands are aliased to the band of 0 kHz to about 16.384 kHz, as shown in axis 702. The high frequency signals can be detected in the band of 0 kHz to 16.384 kHz signals using low effective clock speed due to the one-to-one relationship between high frequency signal and aliased signals.

In certain configurations, the method and system may include other mechanisms for conserving power in the communication nodes of the acoustic wireless network. The power conservation may include repeatedly and sequentially cycling a given communication node for a plurality of cycles by entering a low-power mode or state for a low-power mode duration (e.g., a mode that involves using a low-frequency effective clock speed for detecting incoming signals) and subsequently transitioning to a listening mode for a listening mode duration (e.g., a mode that involves using a high-frequency effective clock speed to decode incoming signals). The low-power mode duration is greater than the listening mode duration to save energy. These methods also include transmitting, during the cycling and via a tone transmission medium, a transmitted acoustic tone for a tone transmission duration, receiving a received acoustic tone, and, responsive to the receiving, interrupting the cycling by transitioning the given communication node to an active mode. The tone transmission duration is greater than the low-power mode duration, such that the acoustic wireless network detects the transmitted acoustic tone regardless of when the transmitting is initiated.

In other configurations, the communication nodes may re-evaluate the aliased frequencies utilized whenever an event is detected. An event may be when the network fails to operate properly. The failure to operate properly may be based on the detection of a local failure; detection of a change in the acoustic environment; detection of a manual trigger and/or detection of a time based period. By way of example, a local failure may be determined if two communication nodes do not communicate with each other after a certain number of attempts (e.g., three failed attempts to communicate and/or five or more failed attempts to communicate). Further, a full system re-evaluation may be detected based on a change in the acoustic environment (e.g., cement, production, injection, and/or fracking). The detection of the acoustic environment changes may involve detecting the environment, determining a change in the environment (e.g., comparing the detected environment with a specific threshold to determine if the change is above the specific threshold). Also, the detection of a manual trigger may be based on a notification transmitted in the system (e.g., a signal from a control unit or top communication node). The detection of a time based period may include determining whether a time period has expired (e.g., time period of 30 minutes, one hour and/or two hours). This detection of a time based period may be performed autonomously. If a failure is detected, the aliased frequencies may be modified or the process, as shown in FIG. 4 may be performed.

The present techniques include a configuration that may utilize communication nodes that are low frequency communication nodes and/or high frequency communication nodes. These different communication nodes may be utilized to provide enhancements to the operation of hydrocarbon operations. By way of example, the communication nodes may include using low frequency communication nodes for locations that do not involve sensing. The low frequency communication nodes may involve a low frequency, long range telemetry system that may be utilized for optimal performance with low system complexity. The high frequency communication nodes may be used for locations that involve sensing (e.g., near completions or zones of interest). The high frequency communication nodes may involve a higher frequency as compared to a low frequency used by the low frequency communication nodes.

By way of example, the configuration may include a combination of two or more of the wireless network types of communication nodes. The communication nodes may include low frequency (e.g., less than or equal to kHz($\leq$) 200 kHz, $\leq$100 kHz, $\leq$50 kHz, or $\leq$20 kHz) acoustic communication nodes; high frequency ultrasonic communication nodes (e.g., greater than ($>$) 20 kHz, $>$50 kHz, $>$100 kHz or $>$200 kHz); and communication nodes that are configured to communicate with low and/or high frequency radio frequencies (RF).

In other configurations, the communication nodes may include other enhancements. For example, the communication nodes may be configured to utilize a low-frequency effective clock speed to monitor for received signals and to wake the communication node from a sleep mode that utilizes the high-frequency effective clock speed; may be configured to communicate with low-frequency effective clock speeds to be able to communicate with other low-frequency devices; may be configured to provide redundant communications; may be configured to adjust or modify the alias frequency and/or may be configured to avoid downhole noise by utilizing aliasing with high pass filter.

For example, the communication nodes may utilize low frequency wake from a sleep mode. The communication nodes may be configured to communicate (e.g., transmit and receive signals), which may include one or multiple high frequencies transmitted and/or low frequency only; and/or the receiver may use low frequency first as a screening tool, then high frequency clock to verify the decoded information.

In yet other communications, the communication nodes may be configured to use low frequencies and/or high frequencies in communication between the communication nodes. For example, the communication nodes may be configured to transmit high-frequency signals and to receive low-frequency signals. The communication nodes may utilize frequencies that have one-to-one relationships; may utilize signals that are associated with multiple frequency bands to increase redundancy (e.g., signals utilize a frequency from the different frequency bands); may use one or more high pass filters to remove background noise (e.g., production noise); and/or may use low-frequency components to receive signals, which is compatible with existing low-frequency devices, such as sensors, communication devices, and/or hydrophones.

In still yet other communications, the communication nodes may be configured to use aliasing to provide a low frequency clock detector, which detects high-frequency signals. The communication nodes may include smaller size transducers (e.g., half inch or smaller or one inch or less for smaller transducers, while larger transducers may be greater than or equal to one inch) sending high frequency signal with low power; may include smaller size transducers that may be used in a small size sensor node package; and/or may include small size transducers to receive transducers to enhance high frequency sensitivity in a small package. In addition, each of the communication nodes may include another transducer (e.g., a second or a third transducer) configured to receive signals, wherein the other transducer may be configured to provide improved low-frequency sensitivity as compared to the second transducer and the third transducer is larger than the first transducer and the second transducer. Further, the communication nodes may have effective clock speeds that may be determined before installation as well as changed dynamically at runtime (e.g., during hydrocarbon operations, or when disposed along the tubular member). The changes may include adjusting the effective clock speed, which may be performed in for all of the communication nodes or within certain sections along the tubular members.

Persons skilled in the technical field will readily recognize that in practical applications of the disclosed methodology, it is partially performed on a computer, typically a suitably programmed digital computer or processor based device. Further, some portions of the detailed descriptions which follow are presented in terms of procedures, steps, logic blocks, processing and other symbolic representations of operations on data bits within a computer memory. These descriptions and representations are the means used by those skilled in the data processing arts to most effectively convey the substance of their work to others skilled in the art. In the present application, a procedure, step, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "processing" or "computing", "calculating", "comparing", "determining", "displaying", "copying," "producing," "storing," "adding," "applying," "executing," "maintaining," "updating," "creating," "constructing" "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Embodiments of the present techniques also relate to an apparatus for performing the operations herein. This apparatus, such as the control unit or the communication nodes, may be specially constructed for the required purposes, or it may comprise a general-purpose computer or processor based device selectively activated or reconfigured by a computer program stored in the computer (e.g., one or more sets of instructions). Such a computer program may be stored in a computer readable medium. A computer-readable medium includes any mechanism for storing or transmitting information in a form readable by a machine (e.g., a computer). For example, but not limited to, a computer-readable (e.g., machine-readable) medium includes a machine (e.g., a computer) readable storage medium (e.g., read only memory ("ROM"), random access memory ("RAM"), magnetic disk storage media, optical storage media, flash memory devices, etc.), and a machine (e.g., computer) readable transmission medium (electrical, optical, acoustical or other form of propagated signals (e.g., carrier waves, infrared signals, digital signals, etc.)).

Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present techniques are in no way limited to implementation in any specific operating system or environment.

The hydrocarbon operations may include utilizing the communication nodes. The communication network may include performing serial networking; may include performing parallel processes in different zones along the tubular members; may include one or more radio networks (e.g., at the topside, which may be below grade); may include one or more hydrophone networks, may include wired networks, which may be wired to a specific depth or within specific regions along the tubular members. The communication nodes may be configured to operate autonomously based on predefined or built-in rules, or implicitly by other communication nodes conveying instructions and may even adjust the instructions during operations.

By way of example, the control unit may include a computer system that may be used to perform any of the methods disclosed herein. A central processing unit (CPU) is coupled to system bus. The CPU may be any general-purpose CPU, although other types of architectures of CPU (or other components of exemplary system) may be used as long as CPU (and other components of system) supports the inventive operations as described herein. The CPU may execute the various logical instructions according to disclosed aspects and methodologies. For example, the CPU may execute machine-level instructions for performing processing according to aspects and methodologies disclosed herein.

The computer system may also include computer components such as a random access memory (RAM), which may be SRAM, DRAM, SDRAM, or the like. The computer system may also include read-only memory (ROM), which may be PROM, EPROM, EEPROM, NOR flash, NAND flash or the like. RAM and ROM hold user and system data and programs, as is known in the art. The computer system may also include an input/output (I/O) adapter, a graphical processing unit (GPU), a communications adapter, a user interface adapter, and a display adapter. The I/O adapter, the user interface adapter, and/or communications adapter may, in certain aspects and techniques, enable a user to interact with computer system to input information.

The I/O adapter preferably connects a storage device(s), such as one or more of hard drive, compact disc (CD) drive, floppy disk drive, tape drive, etc. to computer system. The storage device(s) may be used when RAM is insufficient for the memory requirements associated with storing data for operations of embodiments of the present techniques. The data storage of the computer system may be used for storing information and/or other data used or generated as disclosed herein. The communications adapter may couple the computer system to a network (not shown), which may include the communication network for the wellbore and a separate network to communicate with remote locations), which may enable information to be input to and/or output from system via the network (for example, a wide-area network, a local-area network, a wireless network, any combination of the foregoing). User interface adapter couples user input devices, such as a keyboard, a pointing device, and the like, to computer system. The display adapter is driven by the CPU to control, through a display driver, the display on a display device.

The architecture of system may be varied as desired. For example, any suitable processor-based device may be used, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may use any number of suitable structures capable of executing logical operations according to the embodiments.

As may be appreciated, the method may be implemented in machine-readable logic, such that a set of instructions or code that, when executed, performs the instructions or operations from memory. By way of example, the communication nodes may include a processor; an encoding component, a decoding component and memory. The decoding component is in communication with the processor and is configured to receive operational data associated with hydrocarbon operations. The memory is in communication with the processor and the memory has a set of instructions, wherein the set of instructions, when executed, are configured to: communicate operational data between two or more of the plurality of communication nodes, wherein the communication of the operational data is at least partially based on the use of aliased signals; and perform hydrocarbon operations based on the operational data.

In other configurations, communication node may include various enhancements. The communication nodes may include a set of instructions, when executed, are configured to: operate at a low-frequency effective clock speed to receive one or more signals and operate at a high-frequency effective clock speed to transmit one or more signals; transmit a signal at a frequency and to receive the signal, wherein the frequency of the signal is greater than one times, two times, or four times the Nyquist frequency of an effective clock speed in the communication node that receives the signal; transmit a signal at a frequency and to receive the signal, wherein the frequency of the signal has a ratio of a Nyquist frequency of an effective clock speed in the communication node that receives the signal to a transmitted signal frequency that is in a range between 1:1 and 1:1,000 or in a range between 1:2 and 1:10; receive one or more signals, and determine whether the one or more signals indicate that the communication node enter an operational mode; receive one or more signals, determine whether to perform a signal confirmation on the one or more signals, perform the signal confirmation on the one or more signals based on the determination that the signal confirmation is to be performed and then decode the one or more signals, and decode the one or more signals without performing the signal confirmation on the one or more signals if the determination is to not perform the signal confirmation; perform the signal confirmation by decoding at least a portion of the one or more signals by utilizing a high-frequency effective clock speed; transmit one or more signals in a plurality of frequencies from a plurality of frequency bands, wherein the one or more signals comprise a first signal frequency in a first frequency band of the plurality of frequency bands and a second signal frequency from a second frequency band of the plurality of frequency bands, wherein the first frequency band is different from the second frequency band and the first signal frequency and the second signal frequency are configured to represent the same signal frequency based on a low-frequency effective clock speed that one or more of the plurality of communication nodes are configured to receive the one or more signals; wherein each of the plurality of communication nodes are further configured to: receive one or more signals, and filter the one or more signals using a high pass filter to lessen background noise from the one or more signals; and/or i) monitor the communication network for an event, ii) modify the aliased frequencies utilized in the communication network if an event is detected, iii) continue communicating with the two or more of the plurality of communication nodes if an event is not detected, and iv) repeat steps i) to iii) until the hydrocarbon operations are complete.

It should be understood that the preceding is merely a detailed description of specific embodiments of the invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents. It is also contemplated that structures and features embodied in the present examples can be altered, rearranged, substituted, deleted, duplicated, combined, or added to each other. As such, it will be apparent, however, to one skilled in the art, that many modifications and variations to the embodiments described herein are possible. All such modifications and variations are intended to be within the scope of the present invention, as defined by the appended claims.

The invention claimed is:

1. A method of communicating data among a plurality of communication nodes, the method comprising:
 disposing the plurality of communication nodes within a wellbore;
 creating a communication network, wherein the communication network comprises the plurality of communication nodes, wherein each of the plurality of communication nodes is configured to utilize aliased frequencies in one or more signals to communicate between two or more of the plurality of communication nodes;
 configuring the plurality of communication nodes;
 communicating operational data between the two or more of the plurality of communication nodes, wherein the communicating the operational data is at least partially based on the one or more signals in which the aliased frequencies are utilized to communicate the operational data; and performing operations based on the operational data;

receiving the one or more signals in the two or more of the plurality of communication nodes;

determining whether to perform a signal confirmation on the one or more signals received in the two or more of the plurality of communication nodes;

performing the signal confirmation on the one or more signals based received in the two or more of the plurality of communication nodes on the determination that the signal confirmation should be performed and then decoding the one or more signals received in the two or more of the plurality of communication nodes; and decoding the one or more signals received in the two or more of the plurality of communication nodes without performing the signal confirmation on the one or more signals received in the two or more of the plurality of communication nodes if the determination is to not perform the signal confirmation.

2. The method of claim 1, further comprising disposing the plurality of communication nodes along one or more tubular members.

3. The method of claim 1, wherein said each of the plurality of communication nodes comprise a processor that operates at a low-frequency effective clock speed to receive the one or more signals and at a high-frequency effective clock speed to transmit the one or more signals.

4. The method of claim 3, wherein a ratio of the low-frequency effective clock speed to the high-frequency effective clock speed is greater than 1:2.

5. The method of claim 3, wherein a ratio of the low-frequency effective clock speed to the high-frequency effective clock speed is greater than 1:10.

6. The method of claim 1, wherein a signal transmitted from a first communication node of the two or more of the plurality of communication nodes operates at a frequency that is greater than one times a Nyquist frequency of an effective clock speed in a second communication node of the two or more of the plurality of communication nodes.

7. The method of claim 1, wherein a signal transmitted from a first communication node of the two or more of the plurality of communication nodes operates at a frequency that is greater than two times a Nyquist frequency of an effective clock speed in a second communication node of the two or more of the plurality of communication nodes.

8. The method of claim 1, wherein a signal transmitted from a first communication node of the two or more of the plurality of communication nodes operates at a frequency that is greater than four times a Nyquist frequency of an effective clock speed in a second communication node of the two or more of the plurality of communication nodes.

9. The method of claim 1, wherein a signal transmitted from a first communication node of the two or more of the plurality of communication nodes has a ratio of a Nyquist frequency of an effective clock speed in a second communication node of the two or more of the plurality of communication nodes to a transmitted signal frequency that is in a range between 1:1 and 1:1,000.

10. The method of claim 1, wherein a signal transmitted from a first communication node of the two or more of the plurality of communication nodes has a ratio of a Nyquist frequency of an effective clock speed in a second communication node of the two or more of the plurality of communication nodes to a transmitted signal frequency that is in a range between 1:2 and 1:10.

11. The method of claim 1, further comprising determining a lowest transmitted frequency of interest in the communication network and selecting a sampling frequency lower than the lowest transmitted frequency of interest for use in the communicating the operational data between the two or more of the plurality of communication nodes.

12. The method of claim 1, wherein said each of the plurality of communication nodes is configured to receive the one or more signals and determine whether the one or more signals received by said each of the plurality of communication nodes indicate that said each of the plurality of communication nodes enters an operational mode.

13. The method of claim 1, wherein said performing the signal confirmation includes performing a high-frequency confirmation that decodes at least a portion of the one or more signals received in the two or more of the plurality of communication nodes by utilizing a high-frequency effective clock speed in the two or more of the plurality of communication nodes.

14. The method of claim 1, wherein the communicating the operational data between the two or more of the plurality of communication nodes comprises transmitting the one or more signals from a first communication node of the plurality of communication nodes using a plurality of frequency bands, wherein the one or more signals transmitted from the first communication node comprise a first signal frequency in a first frequency band of the plurality of frequency bands and a second signal frequency from a second frequency band of the plurality of frequency bands, wherein the first frequency band is different from the second frequency band and the first signal frequency and the second signal frequency represent same aliased frequency based on a low-frequency effective clock speed operating in a second communication node of the two or more of the plurality of communication nodes.

15. The method of claim 1, wherein the communicating the operational data between the two or more of the plurality of communication nodes comprises:
receiving the one or more signals in the two or more of the plurality of communication nodes; and
filtering the one or more signals received in the two or more of the plurality of communication nodes using a high pass filter to lessen background noise from the one or more signals in the two or more of the plurality of communication nodes.

16. The method of claim 1, further comprising communicating the operational data between one of the plurality of communication nodes and a hydrophone disposed within a the wellbore.

17. The method of claim 1, further comprising:
i) monitoring the communication network for an event;
ii) modifying the aliased frequencies used in the communication network if the event is detected; and
iii) continuing communicating between the two or more of the plurality of communication nodes if the event is not detected; and
iv) repeating steps i) to iii) until the operations are complete.

18. The method of claim 1, further comprising disposing the plurality of communication nodes and one or more tubular members within the wellbore.

19. The method of claim 1, further comprising disposing the plurality of communication nodes and one or more tubular members along a subsea conduit.

20. The method of claim 1, further comprising disposing the plurality of communication nodes and one or more tubular members along a pipeline.

21. The method of claim 1, further comprising disposing the plurality of communication nodes and one or more tubular members along a drilling string.

22. A system for communicating along one or more of a plurality tubular members comprising:
the plurality of tubular members;
a communication network coupled to the one or more of the plurality of tubular members, wherein the communication network comprises a plurality of communication nodes disposed within a wellbore, wherein each of the plurality of communication nodes are configured to:
communicate operational data between two or more of the plurality of communication nodes, wherein the communication of the operational data is at least partially based on aliased frequencies; and
perform operations based on the operational data
receive one or more signals;
determine whether to perform a signal confirmation on the one or more signals; perform the signal confirmation on the one or more signals based on the determination that the signal confirmation is to be performed and then decode the one or more signals; and
decode the one or more signals without performing the signal confirmation on the one or more signals if the determination is to not perform the signal confirmation.

23. The system of claim 22, wherein said each of the plurality of communication nodes comprise a processor configured to operate at a low-frequency effective clock speed to receive the one or more signals and to operate at a high-frequency effective clock speed to transmit the one or more signals.

24. The system of claim 23, wherein a ratio of the low-frequency effective clock speed to the high-frequency effective clock speed is greater than 1:2.

25. The system of claim 23, wherein a ratio of the low-frequency effective clock speed to the high-frequency effective clock speed is greater than 1:10.

26. The system of claim 22, wherein said each of the plurality of communication nodes is configured to transmit a signal at a frequency and to receive the signal, wherein the frequency of the signal is greater than one times a Nyquist frequency of an effective clock speed in said each of the communication nodes that receives the signal.

27. The system of claim 22, wherein said each of the plurality of communication nodes is configured to transmit a signal at a frequency and to receive the signal, wherein the frequency of the signal is greater than two times a Nyquist frequency of an effective clock speed in said each of the communication nodes that receives the signal.

28. The system of claim 22, wherein said each of the plurality of communication nodes is configured to transmit a signal at a frequency and to receive the signal, wherein the frequency of the signal is greater than four times a Nyquist frequency of an effective clock speed in said each of the communication nodes that receives the signal.

29. The system of claim 22, wherein said each of the plurality of communication nodes is configured to transmit a signal at a frequency and to receive the signal, wherein the frequency of the signal has a ratio of a Nyquist frequency of an effective clock speed in said each of the communication nodes that receives the signal to a transmitted signal frequency that is in a range between 1:1 and 1:1,000.

30. The system of claim 22, wherein said each of the plurality of communication nodes is configured to transmit a signal at a frequency and to receive the signal, wherein the frequency of the signal has a ratio of a Nyquist frequency of an effective clock speed in said each of the communication nodes that receives the signal to a transmitted signal frequency that is in a range between 1:2 and 1:10.

31. The system of claim 22, wherein said each of the plurality of communication nodes is configured to:
receive the one or more signals; and
determine whether the one or more signals indicate that said each of the communication nodes enter an operational mode.

32. The system of claim 22, wherein said each of the plurality of communication nodes are further configured to perform the signal confirmation by decoding at least a portion of the one or more signals by utilizing a high-frequency effective clock speed.

33. The system of claim 22, wherein said each of the plurality of communication nodes are configured to transmit the one or more signals in a plurality of frequencies from a plurality of frequency bands, wherein the one or more signals comprise a first signal frequency in a first frequency band of the plurality of frequency bands and a second signal frequency from a second frequency band of the plurality of frequency bands, wherein the first frequency band is different from the second frequency band and the first signal frequency and the second signal frequency are configured to represent same aliased frequency based on a low-frequency effective clock speed that the two or more of the plurality of communication nodes are configured to receive the one or more signals.

34. The system of claim 22, wherein said each of the plurality of communication nodes are further configured to:
receive the one or more signals; and
filter the one or more signals using a high pass filter to lessen background noise from the one or more signals.

35. The system of claim 22, further comprising a hydrophone configured to be disposed within the wellbore and configured to exchange the operational data with at least one of the plurality of communication nodes.

36. The system of claim 22, wherein said each of the plurality of communication nodes are further configured to:
i) monitor the communication network for an event;
ii) modify the aliased frequencies utilized in the communication network if the event is detected;
iii) continue communicating with the two or more of the plurality of communication nodes if the event is not detected; and
iv) repeat steps i) to iii) until the operations are complete.

37. The system of claim 22, wherein at least one of the plurality of communication nodes include a primary transducer configured to transmit the one or more signals and to receive the one or more signals.

38. The system of claim 37, wherein the at least one of the plurality of communication nodes include a secondary transducer configured to receive the one or more signals, wherein the secondary transducer is configured to provide improved low-frequency sensitivity as compared to the primary transducer.

39. The system of claim 22, wherein said each of the plurality of communication nodes include a first transducer configured to transmit the one or more signals and a second transducer configured to receive the one or more signals.

40. The system of claim 39, wherein the first transducer is smaller than the second transducer.

41. The system of claim 40, wherein the each of the plurality of communication nodes include a third transducer configured to receive the one or more signals, wherein the third transducer is configured to provide improved low-frequency sensitivity as compared to the second transducer and the third transducer is larger than the first transducer and the second transducer.

42. The system of claim 22, wherein the plurality of tubular members are disposed within the wellbore.

43. The system of claim 22, wherein the plurality of tubular members are disposed within a subsea conduit.

44. The system of claim 22, wherein the plurality of tubular members are disposed within a pipeline.

* * * * *